ized by United States Patent
Kent et al.

(10) Patent No.: US 9,454,266 B2
(45) Date of Patent: Sep. 27, 2016

(54) TOUCHSCREEN FOR DETECTING MULTIPLE TOUCHES

(75) Inventors: Joel C. Kent, Fremont, CA (US); James L. Aroyan, Santa Cruz, CA (US); Ting Gao, Sunnyvale, CA (US); Yoshikazu Tanaka, Yokohama Kanagawa (JP); Daniel H. Scharff, San Leandro, CA (US)

(73) Assignee: Elo Touch Solutions, Inc., Menlo Park, CA (US)

( * ) Notice: Subject to any disclaimer, the term of this patent is extended or adjusted under 35 U.S.C. 154(b) by 9 days.

(21) Appl. No.: 13/550,063

(22) Filed: Jul. 16, 2012

(65) Prior Publication Data

US 2012/0280942 A1 Nov. 8, 2012

Related U.S. Application Data

(62) Division of application No. 11/789,776, filed on Apr. 25, 2007, now Pat. No. 8,243,048.

(51) Int. Cl.
*G06F 3/041* (2006.01)
*G06F 3/043* (2006.01)
*G06F 3/042* (2006.01)

(52) U.S. Cl.
CPC ........... *G06F 3/0436* (2013.01); *G06F 3/0421* (2013.01)

(58) Field of Classification Search
CPC .............. G06F 2203/04109; G06F 3/041; G06F 3/042; G06F 3/0421; G06F 3/0428; G06F 3/043; G06F 3/0433; G06F 3/0436; G02B 27/10–27/16
See application file for complete search history.

(56) References Cited

U.S. PATENT DOCUMENTS

| 4,766,424 A | 8/1988 | Adler et al. |
| 4,820,030 A | 4/1989 | Griffin |
| 5,573,077 A * | 11/1996 | Knowles ..................... 178/18.04 |
| 5,605,406 A | 2/1997 | Bowen |
| 5,723,934 A | 3/1998 | Toda |
| 5,854,450 A | 12/1998 | Kent |
| 5,914,709 A | 6/1999 | Graham et al. |

(Continued)

FOREIGN PATENT DOCUMENTS

| CN | 1527988 A | 9/2004 |
| JP | 61-074024 | 4/1986 |

(Continued)

OTHER PUBLICATIONS

Office Action from Japanese Patent Application No. 2010-506256, dated Feb. 5, 2013.

(Continued)

*Primary Examiner* — William Boddie
*Assistant Examiner* — Bryan Earles
(74) *Attorney, Agent, or Firm* — Sterne, Kessler, Goldstein & Fox P.L.L.C.

(57) ABSTRACT

A touchscreen system comprises a touch area. At least one transmitter is positioned proximate to outer edges of the touch area for transmitting first beams in a first direction. At least one beam splitter is positioned proximate to the outer edges of the touch area for splitting the first beams into at least second and third beams that travel through the touch area in at least second and third directions, respectively. The at least one beam splitter comprises a plurality of deflecting elements. Receivers are positioned proximate to the outer edges of the touch area for receiving the at least second and third beams.

39 Claims, 24 Drawing Sheets

(56) References Cited

U.S. PATENT DOCUMENTS

| | | |
|---|---|---|
| 6,087,599 A | 7/2000 | Knowles |
| 6,429,857 B1 | 8/2002 | Masters et al. |
| 6,636,201 B1 | 10/2003 | Gomes et al. |
| 6,750,853 B2 | 6/2004 | Takahashi et al. |
| 6,756,973 B2 | 6/2004 | Sano et al. |
| 6,768,484 B2 | 7/2004 | Sano et al. |
| 6,911,973 B2 | 6/2005 | Katsuki et al. |
| 7,061,475 B2 | 6/2006 | Kent |
| 7,079,120 B2 | 7/2006 | Katsuki et al. |
| 7,099,553 B1 | 8/2006 | Graham et al. |
| 7,184,029 B2 | 2/2007 | Katsuki et al. |
| 7,302,156 B1 | 11/2007 | Lieberman et al. |
| 7,333,094 B2 | 2/2008 | Lieberman et al. |
| 7,421,167 B2* | 9/2008 | Charters et al. ............ 385/48 |
| 7,786,983 B2 | 8/2010 | Graham |
| 8,243,048 B2 | 8/2012 | Kent et al. |
| 2002/0012858 A1 | 1/2002 | Kawakubo et al. |
| 2002/0067348 A1* | 6/2002 | Masters et al. ............ 345/175 |
| 2002/0163648 A1* | 11/2002 | Degertekin et al. ........ 356/499 |
| 2003/0164820 A1* | 9/2003 | Kent ........................... 345/177 |
| 2004/0001048 A1 | 1/2004 | Kraus et al. |
| 2004/0017355 A1* | 1/2004 | Shim .......................... 345/157 |
| 2004/0263860 A1* | 12/2004 | Johnson ..................... 356/499 |
| 2005/0248548 A1 | 11/2005 | Tsumura et al. |
| 2007/0097097 A1* | 5/2007 | Liao ........................... 345/175 |

FOREIGN PATENT DOCUMENTS

| | | |
|---|---|---|
| JP | 2004-295644 A | 10/2004 |
| WO | WO 2005/094176 | 6/2011 |

OTHER PUBLICATIONS

Office Action for European Application No. EP 08743243.1 (counterpart to U.S. Appl. No. 11/789,776) dated Feb. 1, 2010.

International Search Report for International Application No. PCT/US2008/005286 mailed Apr. 7, 2009.

Vikuiti™ Transmissive Right Angle Film (TRAF) II, 3M company 2000, 2 pgs.

European Search Report directed to related European Patent Application No. 14178896.8, mailed Nov. 21, 2014; 7 pages.

Office Action directed to related Chinese Patent Application No. 2013100271352, with attached English-language translation, mailed Apr. 20, 2015; 14 pages.

Written Opinion of the International Searching Authority directed to related International Patent Application No. PCT/US2008/005286, mailed Apr. 7, 2009; 7 pages.

* cited by examiner

TOUCHSCREEN FOR DETECTING MULTIPLE TOUCHES

CROSS REFERENCE TO RELATED APPLICATIONS

This application is a divisional of U.S. application Ser. No. 11/789,776, filed Apr. 25, 2007.

BACKGROUND OF THE INVENTION

This invention relates generally to touchscreens, and more particularly, to touchscreens used to detect multiple touches.

Applications that have a need or requirement for sensing multiple touches are becoming more popular. For example, applications that use graphical interfaces to input information such as by displaying a standard keyboard on the screen may rely on a user selecting two keys at the same time, such as a shift key to make an upper-case character selection. Also, as screens become smaller, selecting multiple graphics at the same time may be desirable to provide input capability to a user within the smaller touchscreen footprint. Gaming and other multi-user applications also increase the need for detecting touches from two or more users interacting with the same touchscreen at the same time.

Some touch technologies, such as most resistive and capacitive touchscreens, may produce a single erroneous touch coordinate when subjected to simultaneous multiple touches. In contrast, surface acoustic wave (SAW) touchscreens and infrared (IR) touchscreens look at SAW and IR shadows, respectively, and produce a distinct shadow for each of the multiple simultaneous touches. SAW and IR touchscreens are therefore promising for multiple-touch applications, however, some ambiguity still exists in current SAW and IR touch technologies. A shadow-based touchscreen may receive two X coordinates and two Y coordinates for two touches, but may not automatically know which of the two X coordinates should be paired with which of the two Y coordinates. The processor may attempt to determine which coordinates should be paired based on graphics that were displayed at the time or by using other factors, such as a time of a lift-off event, but unfortunately these methods do not always produce reliable results.

Some current technology, such as some IR touchscreen designs using slightly non-parallel IR beams, may be able to discern multiple touches that are widely separated from each other, but are not able to discern multiple touches that occur in closer proximity to one another. Turning to SAW touchscreens, the problem of pairing X and Y coordinates has been addressed by measuring a third coordinate U. Such touchscreens may be referred to as "XYU touchscreens". The coordinate U may be referred to as a rotated or diagonal coordinate and is linearly related to X and Y as follows in Equation 1, wherein A, B and C are geometrical constants.

$$U=A*X+B*Y+C \qquad \text{Equation 1}$$

If a measured value of X is correctly paired with a measured value of Y, then the computed value of U that is based on the measured values of X and Y, will correspond to a measured value of U. In contrast, if measured X and Y values are incorrectly paired, then the computed value of U will not correspond to any measured value of U.

Unfortunately, known XYU touchscreen technology also has its limitations. To date, XYU touchscreen technology has not been applied to IR touchscreen designs because the narrow light emitting diode (LED) emission cone angle and the narrow phototransistor reception cone angle are incompatible with the common opto-electronic components being used for both X/Y and U beams. Known designs for XYU SAW touchscreens may require larger transmitters and receivers to send and receive acoustic signals due to the additional reflector arrays used to enable detection of multiple simultaneous touches. Also, additional transmit and receive U arrays require scattering by U array reflectors at angles significantly larger than 90 degrees, for which SAW scattering may be inefficient. This contributes to weak signals and acoustic parasites. In addition, SAW touchscreens are sealed to protect from liquid or other products which may come into contact with the touchscreen. The seal may absorb some of the acoustic energy, and it is not allowable to place a seal on top of an array. The seal may thus increase the overall size of the touchscreen or minimize the usable touch area of the touchscreen, both of which are undesirable.

Therefore, a need exists for improved XYU touchscreen designs for detecting multiple touches. Certain embodiments of the present invention are intended to meet these needs and other objectives that will become apparent from the description and drawings set forth below.

BRIEF DESCRIPTION OF THE INVENTION

In one embodiment, a touchscreen system comprises a touch area. At least one transmitter is positioned proximate to outer edges of the touch area for transmitting first beams in a first direction. At least one beam splitter is positioned proximate to the outer edges of the touch area for splitting the first beams into at least second and third beams that travel through the touch area in at least second and third directions, respectively. The at least one beam splitter comprises a plurality of deflecting elements. Receivers are positioned proximate to the outer edges of the touch area for receiving the at least second and third beams.

In another embodiment, a touchscreen system comprises a substrate comprising a touch area having X and Y dimensions. A first X array and a first Y array are fabricated on the substrate proximate to outer edges of the touch area. Transmit transducers transmit beams through the first X and Y arrays, and the first X and Y arrays deflect the beams towards the touch area. First and second beam splitters are fabricated on the substrate between the first X and Y arrays, respectively, and the touch area. The first and second beam splitters each split the beams into at least two beams traveling through the touch area in different directions with respect to each other. Receive transducers receive the at least two beams.

In yet another embodiment, a method for detecting multiple touches on a touchscreen system comprises transmitting first beams proximate to an outer edge of a touch area. The first beams are split to form at least second and third beams traveling in different directions through the touch area with respect to each other. The at least second and third beams traveling in different directions are split to form receive beams. The receive beams are received, and a location of at least one externally generated touch within the touch area is detected based on the receive beams.

DETAILED DESCRIPTION OF THE INVENTION

Figure 1:
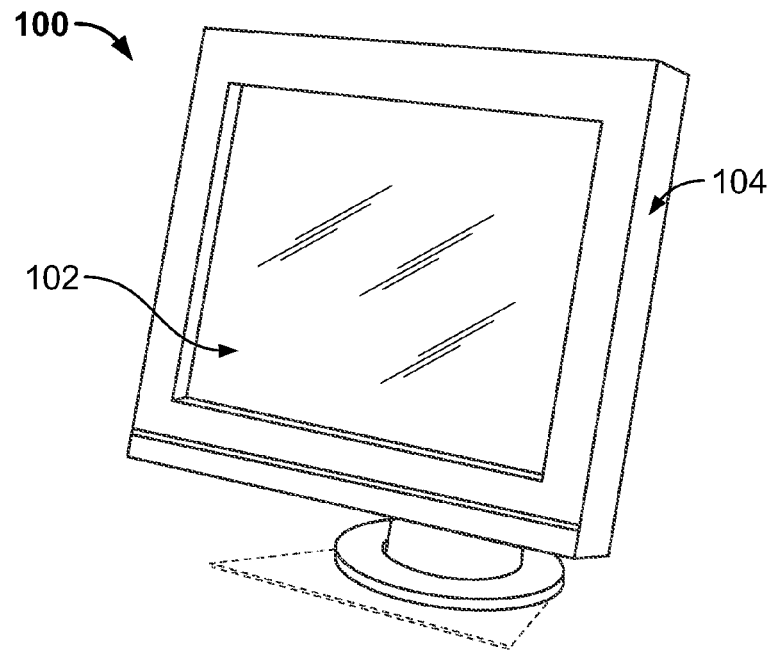
FIG. 1 illustrates a touch display in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

FIG. 1 illustrates a touch display 100 formed in accordance with an embodiment of the present invention. It should be understood that the touch display 100 may be other sizes and shapes. The touch display 100 may be installed on a desk, a wall, or within a kiosk, for example, or similar construction may used to form a hand-held device such as a personal digital assistant (PDA).

The touch display 100 comprises a touchscreen 102 and a display housing 104. The touchscreen 102 is installed over a display screen (not shown). The display housing 104 may extend over outer edges of the touchscreen 102 and the display screen.

Figure 2:
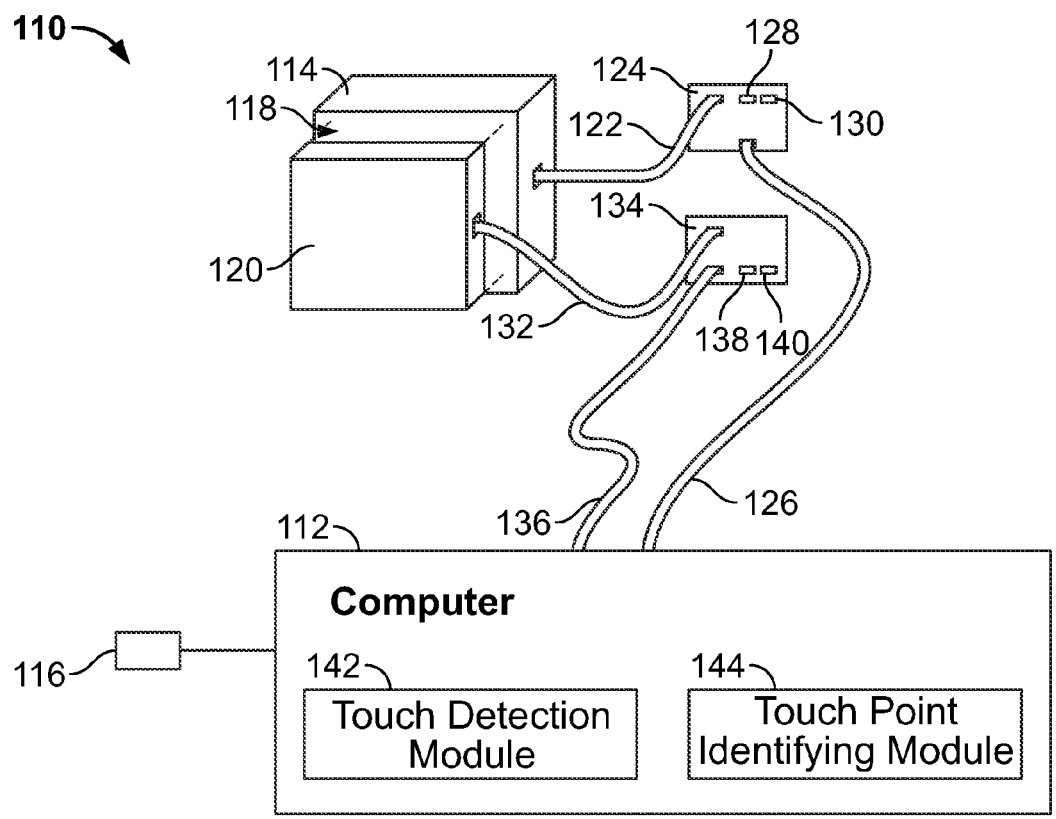
FIG. 2 illustrates a block diagram of a touch display system having a touch display interconnected with a computer in accordance with an embodiment of the present invention.

FIG. 2 illustrates a block diagram of a touch display system 110 having a touch display 114 interconnected with a computer 112. The computer 112 may run one or more applications, such as gaming and entertainment, family-style home computing systems, visualization and manipulation of medical images, retail store and restaurant cash registers, and the like. In addition to the touch display 114, the computer 112 may comprise an alternate user input 116 such as a keyboard and/or a mouse. Although indicated separately, the components of the touch display system 110 may be within a single unit, such as a PDA or other portable device.

The touch display 114 comprises components for displaying data on a display screen 118. The display screen 118 may be an liquid crystal display (LCD), cathode ray tube (CRT), Plasma, organic light-emitting diode (OLED) display, photographic image and the like. A touchscreen 120 is installed over the display screen 118. The touchscreen 120 receives input from a user. For example, if based on SAW technology, the touchscreen 120 has a substrate that is touched by a user via a finger touch, a stylus, and the like. If based on IR technology, the touchscreen 120 might not have a separate substrate positioned over the touch display 114. However, it may be desirable to provide a substrate for protecting the surface of the display screen 118, for example.

A display cable 122 connects the touch display 114 with a display controller 124. The display controller 124 receives video information from the computer 112 over video cable 126. The video information is received and processed by the display controller 124, then transferred to the touch display 114 over the display cable 122 for display on the display screen 118. It should be understood that the touch display 114 and the display controller 124 may be hardwired together or interconnected such that the display cable 122 is not required. The display controller 124 comprises components such as a central processing unit (CPU) 128 and a memory 130.

A touchscreen cable 132 interconnects the touchscreen 120 with a touchscreen controller 134. The touchscreen controller 134 sends and receives information to and from the computer 112 over touch data cable 136. Touch information is received by the touchscreen 120, transferred over the touchscreen cable 132 to the touchscreen controller 134, and then sent over the touch data cable 136 to the computer 112. The touchscreen controller 134 comprises components such as a CPU 138 and memory 140.

A display housing (not shown) may enclose the touch display 114, the display and touchscreen cables 122 and 132, and the display and touchscreen controllers 124 and 134. As discussed in FIG. 1, the display housing may enclose an outer edge portion of the touchscreen 120, securing the touchscreen 120 and/or covering fasteners which secure the touchscreen 120 to the display screen 118. The video and touch data cables 126 and 136 may be separate cables or packaged together. The video and touch data cables 126 and 136 may extend from the display housing to the location of the computer 112. Optionally, the display housing may be a cover for a PDA or other small hand-held or portable device that may or may not hold the computer 112 there-within. Also, the touch data cable 136 and video cable 126 may be replaced by wireless technology.

A touch detection module 142 detects one or more touches on the touchscreen 120. Each touch generates a corresponding X coordinate, Y coordinate, and U coordinate. When multiple touches are detected simultaneously, the touch detection module 142 detects multiple X, Y, and U coordinates that are used by touch point identifying module 144 to pair appropriate X and Y coordinate pairs. While touch detection module 142 and touch point identifying module 144 are shown as residing in computer 112, these modules may equally be located in touchscreen controller 134 or elsewhere within the touch display system 110. Therefore, it should be understood that the embodiment illustrated in FIG. 2 is illustrative only and is not meant to be limiting.

Figure 3:
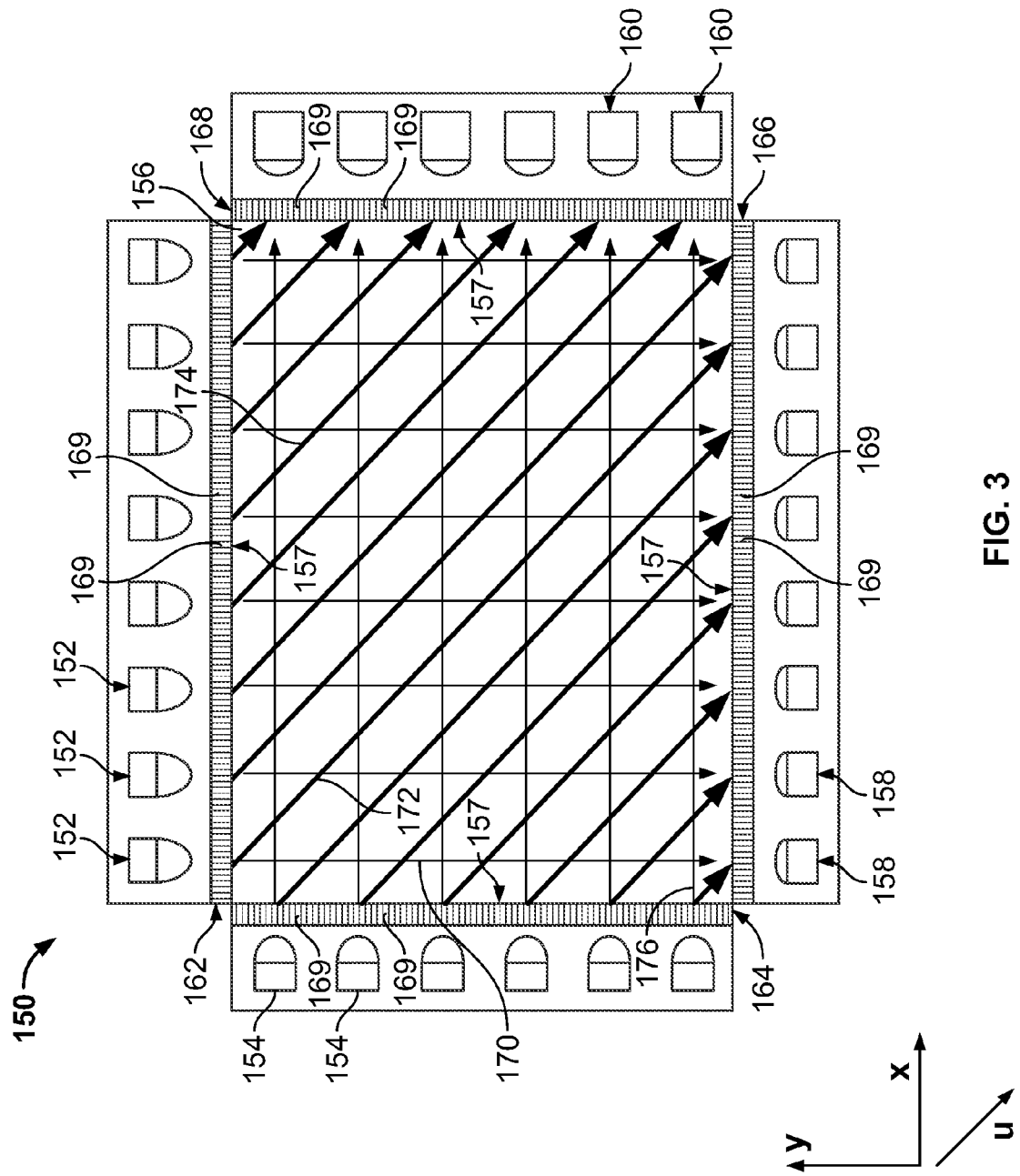
FIG. 3 illustrates an IR touchscreen in accordance with an embodiment of the present invention.

FIG. 3 illustrates an IR touchscreen 150 that has a touch area 156 with outer edges 157 along X (horizontal) and Y (vertical) sides. LEDs or other transmitters 152 and 154 are located proximate to the outer edges 157 of the touch area 156. The transmitters 152 and 154 transmit IR wave energy that is received by receivers 158 and 160, respectively. The receivers 158 and 160 may be phototransistors. The receivers 158 are located proximate to a horizontal side of the touch area 156 opposite the transmitters 152, and the receivers 160 are located proximate to a vertical side of the touch area 156 opposite the transmitters 154. The receivers 158 and 160 and transmitters 152 and 154 may collectively be referred to as opto-devices. For simplicity, not all of the transmitters 152 and 154 and receivers 158 and 160 are indicated with item numbers. Also, many more transmitters 152 and 154 and receivers 158 and 160 may be used within the touchscreen 150 to form many more IR beams or IR beam paths than indicated in FIG. 3. It should be understood that in FIG. 3 and the figures that follow, IR beams are typically represented schematically by an arrow that corresponds to selected rays from the IR transmitter to an IR receiver. Optical paths that do not terminate at an IR receiver do not contribute to touch detection and thus are not shown or discussed.

The touch area 156 may be defined as the area between the transmitters 152 and 154 and receivers 158 and 160, and within the outer edge 157, wherein the user selection is based on a graphic displayed on the display screen 118 (as shown in FIG. 2). Alternatively, the touch area 156 may be defined by a separate substrate positioned over the display screen 118.

Beam splitters 162 and 164 are positioned between the transmitters 152 and 154, respectively, and the touch area 156. Beam splitters 166 and 168 are positioned between the receivers 158 and 160, respectively, and the touch area 156. The beam splitters 162 and 164 use a plurality of deflecting elements 169 to split an incoming beam into at least two different beam components, and are discussed in greater detail below. For example, one beam component may continue to propagate undeflected in the incident direction, or the direction of original IR transmission, and a different beam component is deflected into a diagonal U direction. In other words, IR beams emitted by transmitters 152 and 154 are split into a portion that is not deflected (e.g. travels in the X (horizontal) or Y (vertical) direction) and a portion that is deflected at a significant angle, sending the deflected beam off on a diagonal path (e.g. the U direction). The beam splitters 166 and 168 form a reverse splitting function by receiving the undeflected and diagonal IR beam portions. The diagonal IR beam is redirected by the deflecting elements 169 within the receiving beam splitter 166 or 168 to travel parallel with the undeflected vertical or horizontal IR beam.

By way of example and not limitation, the transmitters 152 and 154 are schematically illustrated as LED packages with a convex focusing lens to represent strong forward focusing of the emitted IR beam. Each of the transmitters 152 and 154 is aimed at one of the receivers 158 and 160, respectively, on the other side of the touch area 156. In one example, the transmitters 152 emit IR beams (not shown) that interface with the beam splitter 162. The beam splitter 162 splits the IR beams into undeflected beams 170 and deflected beams 172. The undeflected beams 170 travel across the touch area 156, enter the beam splitter 166, and are detected by the receiver 158 placed opposite the associated transmitter 152. The deflected beams 172 travel diagonally across the touch area 156 and enter one of the beam splitters 166 and 168. If entering the beam splitter 166, the deflected beam 172 is deflected by deflecting elements within the beam splitter 166 by an angle such that the deflected beam now travels parallel to the undeflected beam 170 being received by the receiver 158. In another example, deflected beam 174 enters and is deflected by deflecting elements of the beam splitter 168 by an angle such that the deflected beam now travels parallel to undeflected beam 176 that was emitted by the transmitter 154.

The beam splitters 162-168 may split the IR beam using one or more of diffraction, refraction and reflection. The beam splitter function may also be accomplished by a lens mounted to each of the transmitters 152 and 154 and receivers 158 and 160, as discussed further below. Use of the beam splitters 162-168 to provide U beams in the IR touchscreen 150 eliminates the need, expense and design complications of providing additional transmitters and receivers (not shown) to generate and detect U beams. Nevertheless, it is a design option to eliminate one, two or three of the beam splitters 162-168. Dedicated U-beam opto-electronic elements may be added to the sides where beam-splitters are removed from the design.

Figure 4:
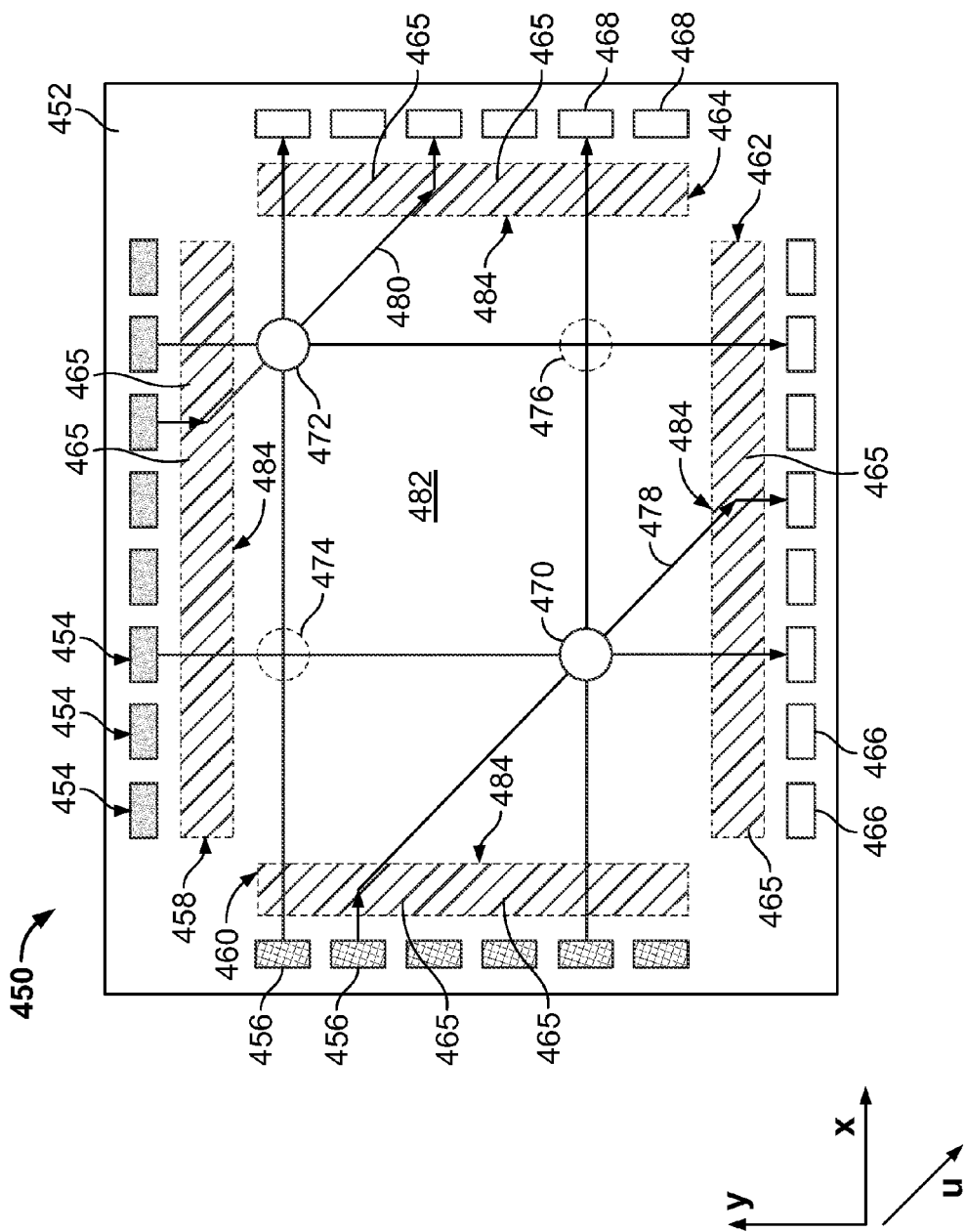
FIG. 4 illustrates a SAW touchscreen in accordance with an embodiment of the present invention.

FIG. 4 illustrates a SAW touchscreen 450 that is analogous to the IR touchscreen 150 of FIG. 3. Substrate 452 supports propagation of surface acoustic waves or beams and may be glass, metal, a low-acoustic-loss polymer system, or other material. SAW may be used to indicate any one or a combination of Rayleigh waves, quasi-Rayleigh waves, Lamb or shear waves, or other types of acoustic waves that are sensitive to a touch on the surface of the substrate 452. Transmitters 454 and 456 excite surface acoustic waves in the substrate 452 and may be wedge transducers, grating transducers, interdigital transducers, or any other type of transducer. Herein, the excited surface acoustic wave is also referred to as the transmitted beam or transmitted SAW beam. Beam splitters 458, 460, 462 and 464 deflect a portion of the incident SAW beam in the U direction with deflecting elements 465 while leaving another portion undeflected. The beam splitters 458, 460, 462 and 464 may be fabricated on the substrate 452 by, for example, screen printing glass frit or composite polymer material inks, or alternatively by etching grooves. Deflected and undeflected beams travel through touch area 482 which may generally be defined by outer edges 484. Receivers 466 and 468 complete SAW acoustic paths and generate analog signals processed by controller electronics. The receivers 466 and 468 may be any one of the types of transducers discussed above.

In one example, first and second touches 470 and 472 that occur simultaneously within the touch area 482 are illustrated. It should be noted that although many more SAW paths are generated, only those SAW paths attenuated by the first and second touches 470 and 472 are shown in FIG. 4. Only the actual first and second touch locations 470 and 472 correspond with the shadowed U paths that are indicated as SAW paths 478 and 480, respectively. Without the U path data, false touch locations 474 and 476 correspond to the same shadows in X and Y directions as the first and second touches 470 and 472 and thus the touch locations may be incorrectly identified.

Figure 5:
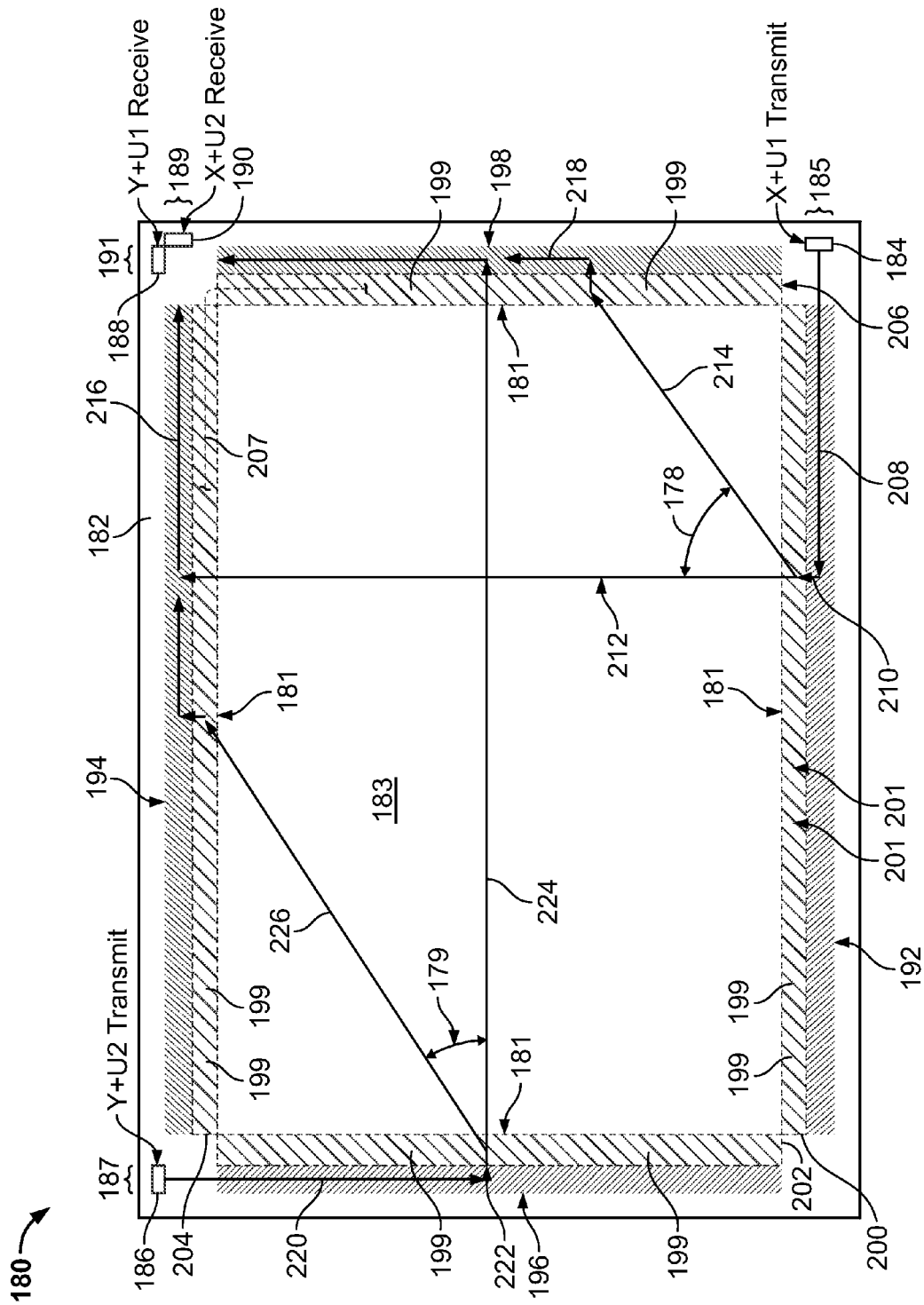
FIG. 5 illustrates another SAW touchscreen in accordance with an embodiment of the present invention.

FIG. 5 illustrates a SAW touchscreen 180 that requires fewer transducers than the SAW touchscreen 450 of FIG. 4. The SAW touchscreen 180 has a touch area 183 that is located in a central portion of a substrate 182. X and Y transmit transducers 184 and 186 and Y and X receive transducers 188 and 190 are mounted on the substrate 182. First and second X arrays 192 and 194 and first and second Y arrays 196 and 198 are mounted and/or fabricated on the substrate 182 proximate to outer edges 181 of the touch area 183. X array 192 and Y array 196 deflect transmitted beams or waves towards the touch area 183, such as at 90 degrees. X array 194 and Y array 198 deflect beams from the touch area 183, such as at 90 degrees. The X transmit transducer 184 and the first X array 192 may together be considered as a first transmitter 185, and the Y transmit transducer 186 and the first Y array 196 may together be considered as a second transmitter 187. The X receive transducer 190 and the second X array 194 may together be considered as a first receiver 189 and the Y receive transducer 188 and the second Y array 198 may together be considered as a second receiver 191. First, second, third and fourth beam splitters 200, 202, 204 and 206 are fabricated (etched or deposited) on the substrate 182 between the first and second X arrays 192 and 194 and the first and second Y arrays 196 and 198, respectively, and the touch area 183 of the touchscreen 180. Each of the first, second, third and fourth beam splitters 200, 202, 204 and 206 has a plurality of deflecting elements 199.

For example, the transmit transducer 184 transmits SAW beam 208 along the first X array 192. The first X array 192 deflects portions of the SAW beam 208 at a 90 degree angle, such as illustrated with deflected beam 210. The deflected beam 210 enters the first beam splitter 200 and is split by the deflecting elements 199 into at least two different beams, such as undeflected beam 212 and U deflected beam 214. (Alternatively, the first X array 192 may deflect the SAW beams 208 by 143 degrees such that the deflected beam 210 enters the first beam splitter 200 parallel to the illustrated U deflected beam 214. In this example, the first beam splitter 200 would pass undeflected the portion of the deflected beam 210 as the U deflected beam 214 as the undeflected beam while deflecting the undeflected beam 212.) It should be understood that there are a large number of deflected beams 210 formed along the length of the first X array 192 which results in a large number of undeflected beams 212 and U deflected beams 214 to sense touch events within the touch area 183 of the touchscreen 180.

The undeflected beam 212 continues along the same path and direction as the deflected beam 210 and the U deflected beam 214 is transmitted along the U or diagonal direction, such as at an approximate 53 degree angle 178 with respect to the undeflected beam 212. In this example, the approximate 53 degree angle of deflection is based on the inverse tangent of touchscreen width divided by height for a 3:4 aspect ratio touch/display system. For example, the deflecting elements 199 of the first beam splitter 200 may be parallel reflector segments that are rotated 26.5 degrees with respect to vertical and spaced along the axis of the first beam splitter 200 with a center-to-center spacing of the SAW wavelength divided by the sine of 53 degrees.

Similarly, the Y transmit transducer 186 transmits SAW beam 220 of which portions are deflected by the first Y array 196 at 90 degrees as deflected beam 222. The deflected beam 222 enters the second beam splitter 202 and is split into undeflected beam 224 and deflected U beam 226. The undeflected beam 224 continues on the original path of the deflected beam 222 while the deflected U beam 226 is deflected at an angle 179 with respect to the undeflected beam 224 or wave, such as at approximately 37 degrees. In this example, the deflection angle 179 of approximately 37 degrees is based on the inverse tangent of touchscreen height divided by width for a 3:4 aspect ratio touch/display system. By way of example, the deflecting elements 199 of the second beam splitter 202 may be formed of ten micron thick screen-printed glass frit reflector lines that are rotated 18.5 degrees with respect to horizontal and spaced by the SAW wavelength divided by the sine of 37 degrees.

The undeflected beam 212 travels across the touch area 183 and passes through the third beam splitter 204. The second X array 194 deflects the undeflected beam 212 at 90 degrees to form return beam 216 that is received by the X receive transducer 190. The U deflected beam 214 is transmitted diagonally across the touch area 183 of the touchscreen 180 and encounters the fourth beam splitter 206. The fourth beam splitter 206, in this case, does split the incoming beam, but only the deflected portion is used. The fourth beam splitter 206 receives multiple beams that have been split and are thus entering the fourth beam splitter 206 at different angles with respect to each other. The fourth beam splitter 206 deflects the U deflected beam 214 at approximately 37 degrees, as discussed previously. The deflected U beam enters the second Y array 198 and is deflected by 90 degrees toward the Y receive transducer 188 as return beam 218.

First, second, third and fourth beam splitters 200, 202, 204 and 206 may be of any construction that provides the desired beam splitting functionality. In one embodiment, the beam splitters 200, 202, 204 and 206 may be fabricated simultaneously with the reflective arrays 192, 194, 196 and 198 using the same materials and processes. Alternatively, the deflecting elements 199 of the beam splitters 200, 202, 204 and 206 may comprise reflective line segments 201 of deposited material or etched glass. The orientation of the deflecting elements 199 is chosen to make the same angle with respect to undeflected and deflected beams, that is, to satisfy the basic "angle of incidence equals angle of reflectance" law of reflections. The spacing of the deflecting elements 199 may be optimally chosen using Bragg's Law to assure coherent addition of deflected beams from neighboring deflecting elements 199. With spacing and orientation so adjusted, both reflection and diffraction effects are utilized.

As discussed, previous XYU array designs had separate transmit U arrays along each transmit side of the touchscreen that were directly illuminated by transmit transducers, and receive U arrays that directly illuminate receive transducers. In the previous designs, it was not allowable to place a seal on top of the transmit and receive U arrays. In contrast, the acoustic path through each of the beam splitters 200, 202, 204, and 206 is short. For example, each of the beam splitters 200, 202, 204 and 206 may be considered to have a bottom side and a top side. The bottom side interfaces with the substrate 182 and a seal 207 may be placed along the top side. For simplicity, the seal 207 is illustrated on portions of the third and fourth beam splitters 204 and 206. However, it should be understood that the seal 207 extends along the entire lengths of the first through fourth beam splitters 200, 202, 204 and 206 to form a moisture and dust barrier. For example, the seal 207 may be 1 mm in width and have a length that extends parallel to the axis of the associated beam splitter. Thus, the beam is subject to acoustic damping from the seal 207 for a distance of only 1 mm.

Figure 6:
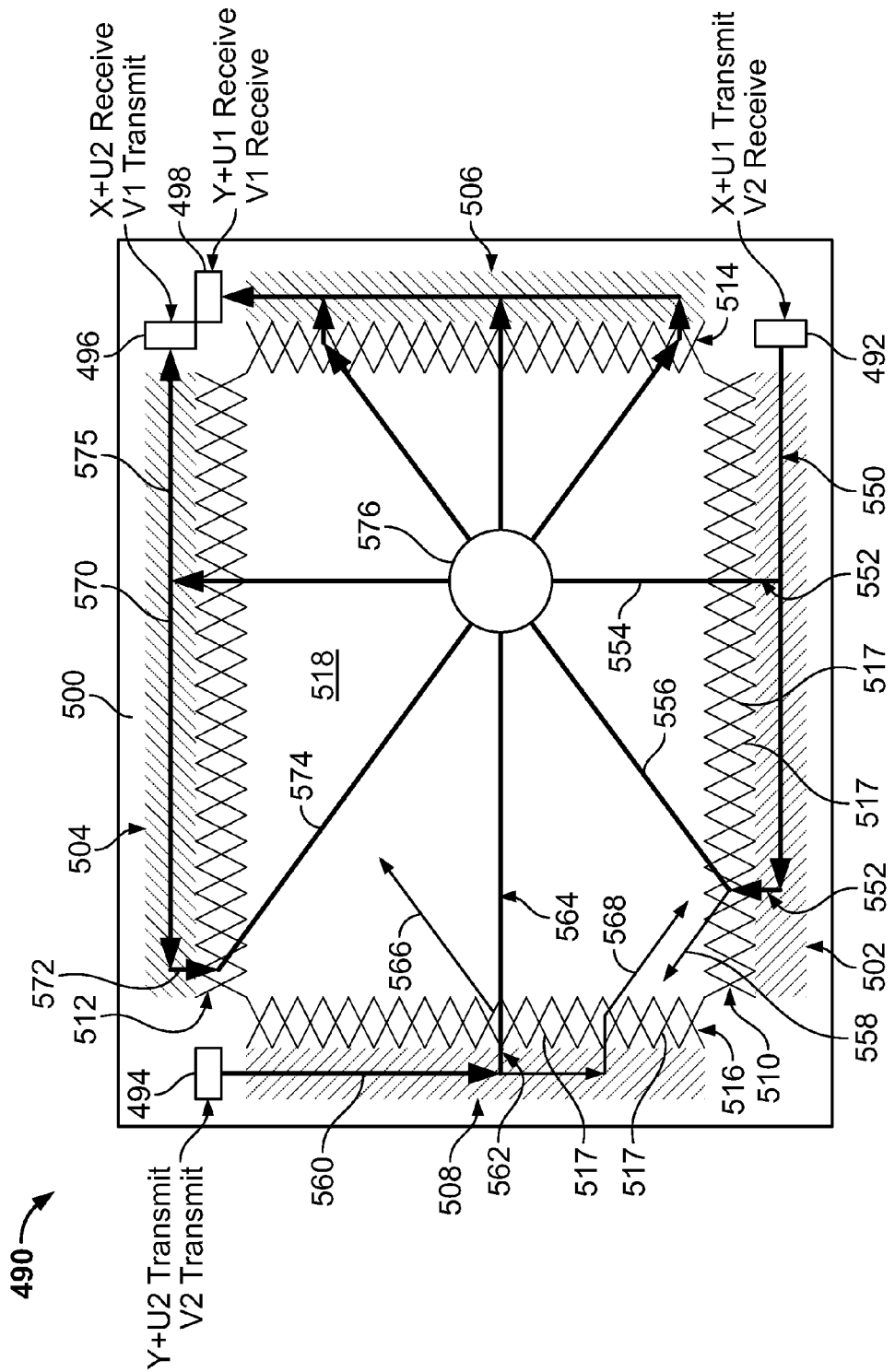
FIG. 6 illustrates a SAW XYUV touchscreen formed in accordance with an embodiment of the present invention.

FIG. 6 illustrates a SAW touchscreen 490 that uses X, Y and U beams as well as another set of diagonal beams, indicated herein as "V" beams. Therefore, the touchscreen 490 may also be referred to as an XYUV touchscreen. X, Y, U and V acoustic paths attenuated by a touch point 576 are primarily illustrated in FIG. 6, although it should be understood that many more X, Y, U, and V acoustic paths are used.

Transducers are used to transmit and receive and may be positioned similar to the transmit and receive transducers of FIG. 5. However, in the touchscreen 490 of FIG. 6, two of the transducers accomplish both transmit and receive functions. The SAW touchscreen 490 has a substrate 500 upon which transmit transducer 494, receive transducer 498, and transmit/receive transducers 492 and 496 are mounted. X arrays 502 and 504 and Y arrays 506 and 508 are fabricated on the substrate 500 and deflect transmitted and received SAW beams at 90 degrees. As was discussed previously with FIG. 5, the transmit transducer 494 and receive transducer 498, together with the respective Y array 508 and Y array 506, may be referred to as a transmitter and a receiver, respectively. The transmit/receive transducers 492 and 496 together with the respective X array 502 and X array 504 may be referred to as a transmitter/receiver. Beam splitters 510, 512, 514, and 516 are fabricated on the substrate 500 between one of the X and Y arrays 502, 504, 506 and 508 and outer edges of touch area 518. The beam splitters 510-516 as illustrated include a superposition of reflective line elements, indicated as deflecting elements 517, having two orientations to produce both deflected U and V beams. Alternatively, the beam splitters 510-516 may be formed of separate arrays to support both of the U and V paths, however, this embodiment may require additional space on the substrate 500 compared to the superposition configuration.

The transmit/receive transducer 492 transmits SAW beam 550 along the X array 502. The X array 502 deflects portions of the SAW beam 550 at a 90 degree angle, illustrated as deflected beam 552 (shown in two locations along the X array 502). The deflected beam 552 enters the beam splitter 510 and is split into at least three different beams, such as undeflected beam 554, U deflected beam 556 and V deflected beam 558. The undeflected beam 554 continues along the same path and direction as the deflected beam 552, the U deflected beam 556 is transmitted along the U or diagonal direction, such as at an approximate 53 degree angle with respect to the undeflected beam 554, and the V deflected beam 558 is transmitted along the V or diagonal direction having an approximately −53 degree angle with respect to the undeflected beam 554. As discussed previously, there are a large number of deflected beams 552 formed along the length of the X array 502, resulting in a large number of undeflected beams 554, U deflected beams 556 and V deflected beams 558. In this example, the V deflected beams 558 are not used to detect a touch within the touch area 518.

The Y transmit transducer 494 transmits SAW beam 560 of which portions are deflected at 90 degrees by the Y array 508 as deflected beam 562. The deflected beam 562 enters the beam splitter 516 and is split into at least undeflected beam 564, U deflected beam 566 and V deflected beam 568, wherein the undeflected beam 564 continues on the original path of the deflected beam 562 and the U deflected beam 566 is deflected at an angle with respect to the undeflected beam 564, such as at approximately 37 degrees. In this example, the deflection angle of approximately 37 degrees is based on the inverse tangent of touchscreen height divided by width for a 3:4 aspect ratio touch/display system. The V deflected beam 568 is deflected at approximately −37 degrees with respect to the undeflected beam 564.

In addition, the transmit/receive transducer 496 transmits SAW beam 570 of which portions are deflected at 90 degrees by the X array 504 as deflected beam 572. The deflected beam 572 enters the beam splitter 512 and is split into at least the three beams as discussed previously. However, only V deflected beam 574 is of interest.

The receive operation will be discussed in terms of the user touch point 576 located within the touch area 518. The undeflected beam 554 travels across the touch area 518 and passes through the beam splitter 512. The X array 504 deflects the undeflected beam 554 at 90 degrees to form return beam 575 that is received by the transmit/receive transducer 496. The U deflected beam 556 and the V deflected beam 574 are transmitted diagonally across the touch area 518 of the touchscreen 490 and encounter the beam splitter 514. The beam splitter 514 receives multiple beams that have been split and thus enter the beam splitter 514 at different angles with respect to each other. The beam splitter 514 deflects the U deflected beam 556 at approximately 37 degrees, as discussed previously, and deflects the V deflected beam 574 at approximately −37 degrees. The U and V deflected beams enter the Y array 506 and are deflected by 90 degrees toward the receive transducer 498.

The transmit/receive transducer 492 receives signals but is not discussed as no signals are received that are associated with the touch point 576 in the above example. The transmit transducer 494 does not look for nor process any signals that are deflected toward the transmit transducer 494. Therefore, the U beam (not shown) transmitted by transmit/receive transducer 496 is disregarded and the V deflected beam 558 transmitted by the transmit/receive transducer 492 is disregarded.

It should be understood that the XYUV touchscreen 490 may be modified such that U and V beams are transmitted and detected, while at least one of X and Y beams may be disregarded. In this case, the single touch point 576 may be detected using only the U and V beams. To unambiguously detect multiple touches, three of the X, Y, U and V beams would be used. The transmit/receive transducer 492 would transmit U1 and receive V2, the transmit transducer 494 would transmit U2 and V2, the transmit/receive transducer 496 would receive U2 and transmit V1, and the receive transducer 498 would receive U1 and V1.

Figure 7:
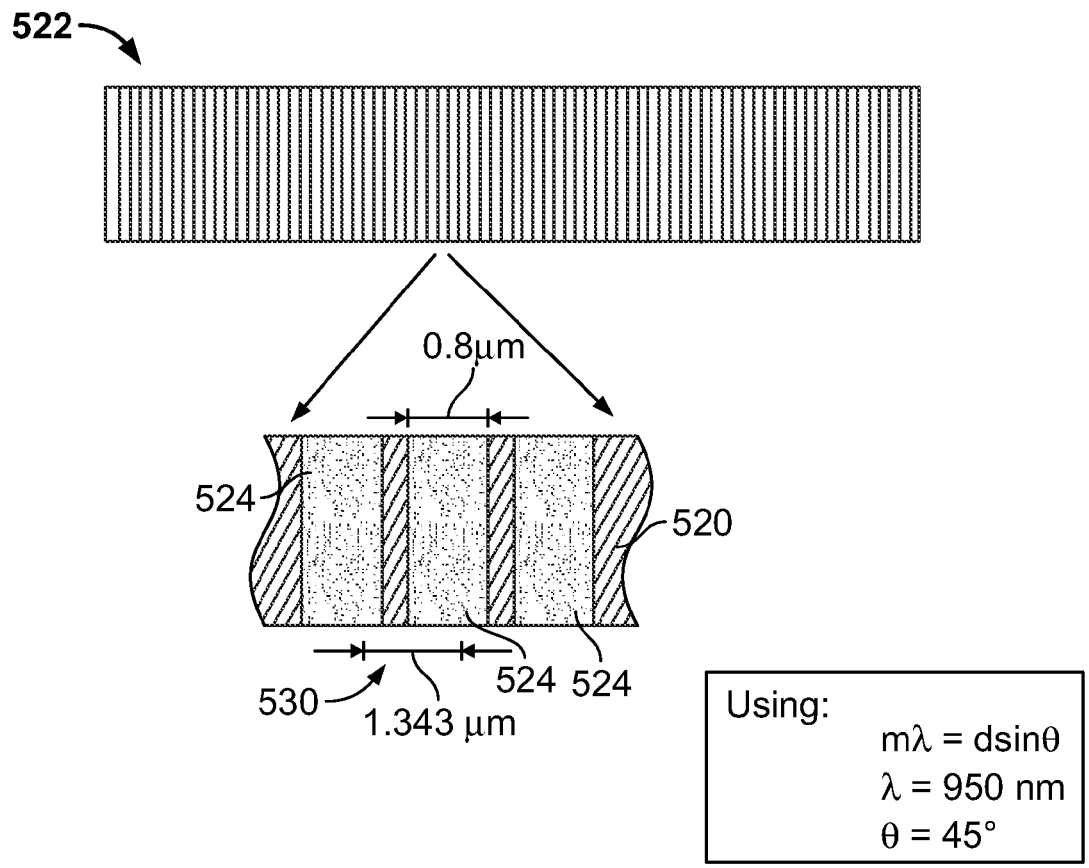
FIG. 7 illustrates an IR diffraction grating that may be formed on a transparent beam-splitter substrate in accordance with an embodiment of the present invention.

Turning now from SAW beam splitters to IR beam splitters, the principles of optical diffraction gratings may be used to construct an IR beam splitter, such as for use with the IR touchscreen 150 of FIG. 3. For example, FIG. 7 illustrates an IR diffraction grating 522 that may be formed on a transparent beam-splitter substrate 520, such as clear plastic or glass, upon which a pattern of stripes or deflecting elements 524 having a grating period 530 is applied to one side. Light is incident normally to the diffraction grating 522, such as into the page in FIG. 7, and upon transmission the light is diffracted by the diffraction grating 522. On an output side of the diffraction grating 522, such as behind the page in FIG. 7, a number beams or diffracted orders emerge with a zero-order beam (m=0) going straight through and first order beams (m=±1) being diffracted at an angle $\theta_1$ and so on. The angles of the diffracted beams may be summarized by Equation 2:

$$m\lambda = d \sin \theta_m \qquad \text{Equation 2}$$

where $\lambda$ is the wavelength of the incident light and d is the grating period. For example, as shown in FIG. 7, in order to obtain 45 degree light splitting, for the wavelength of 950 nm, the grating period 530 is 1.343 microns.

Figure 8:
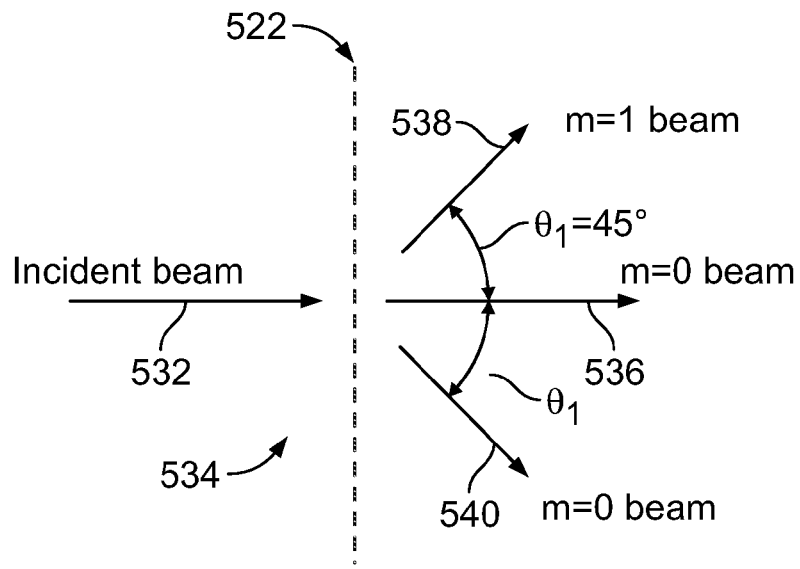
FIG. 8 illustrates the diffraction grating of FIG. 7 and the condition for 45 degree scattering in accordance with an embodiment of the present invention.

FIG. 8 illustrates the diffraction grating 522 and the condition for 45 degree scattering. In this example, the diffraction grating 522 is configured such that $d=(\sqrt{2})\cdot\lambda$, that is, the grating period 530 or spacing is root two times the wavelength of incident beam 532. The incident beam 532 enters input side 534 of the diffraction grating 522. In this case the X and Y beams are represented by undeflected beam 536 (or zero-order beam) and the U and/or V beams are each represented by one of the deflected beams 538 and 540 (or first diffraction peaks). In an XYUV sensor, undeflected beam 536 and deflected beams 538 and 540 may all be used.

Figure 9:
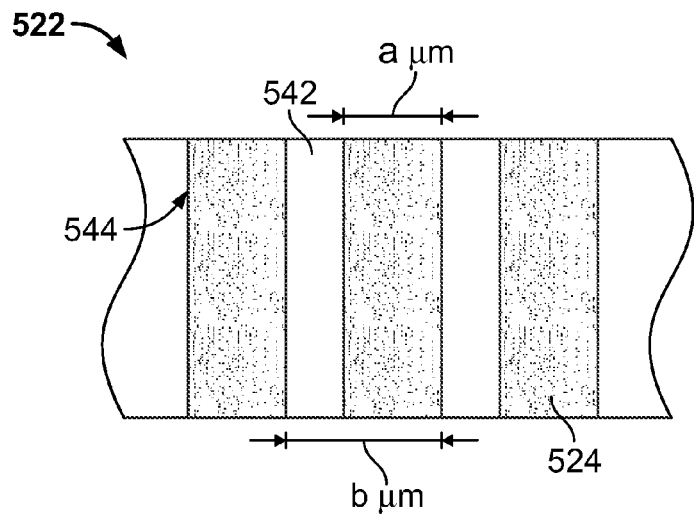
FIG. 9 illustrates an example of adjusting the ratio of transparency and non-transparency spacing of the diffraction grating of FIG. 7 to obtain different intensity ratios between undeflected and deflected beams in accordance with an embodiment of the present invention.

FIG. 9 illustrates an example of adjusting the ratio of the transparency and non-transparency spacing of the diffraction grating 522. The deflecting elements 524 (also in FIG. 7) of the diffraction grating 522 indicate non-transparent areas 544, between which are transparent areas 542. By adjusting the transparent and non-transparent areas 542 and 544 different intensity ratios between the undeflected and deflected beams 536, 538 and 540 will be obtained. If it is desired to avoid such micron resolution patterning, the refraction and reflection based IR beam splitter designs below may be more attractive.

Refraction and reflection based IR beam splitters may be formed of a material having an appropriate level of IR transmission and an index of refraction at a predetermined IR wavelength. By way of example only, the material may have an index of refraction N=1.55, or other value of N corresponding to an engineering plastic. Also, deflecting elements such as prisms, facets or notches are formed in the beam splitter to provide the actual beam splitting functions. Each deflecting element may have multiple surfaces, and each surface may be uncoated, coated, mirrored, or otherwise modified to provide the desired refractive and/or reflective function. Also, the multiple surfaces may be positioned with respect to each other to minimize undesired reflection, and/or to achieve the desired transmit angles of the output beams.

Figure 10:
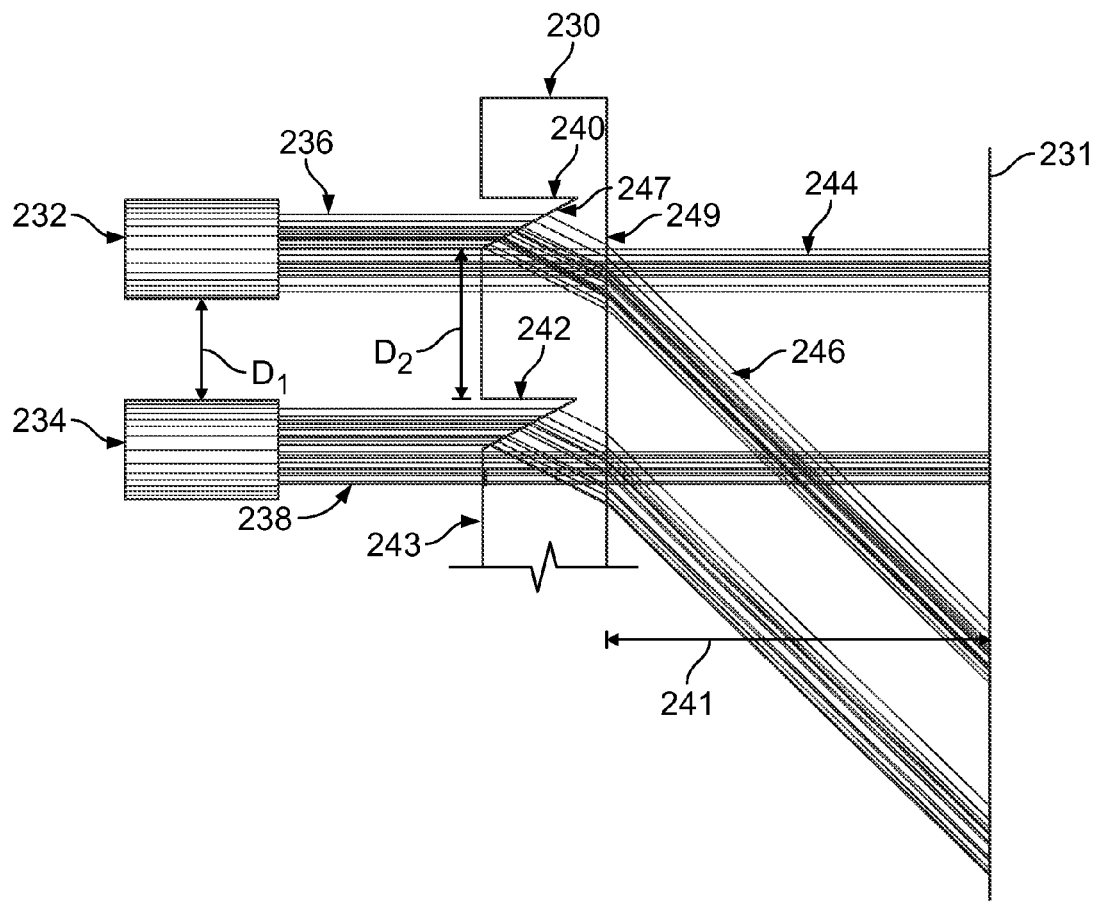
FIG. 10 illustrates a two-dimensional (2D) view of a refractive beam splitter in accordance with an embodiment of the present invention.
Figure 11:
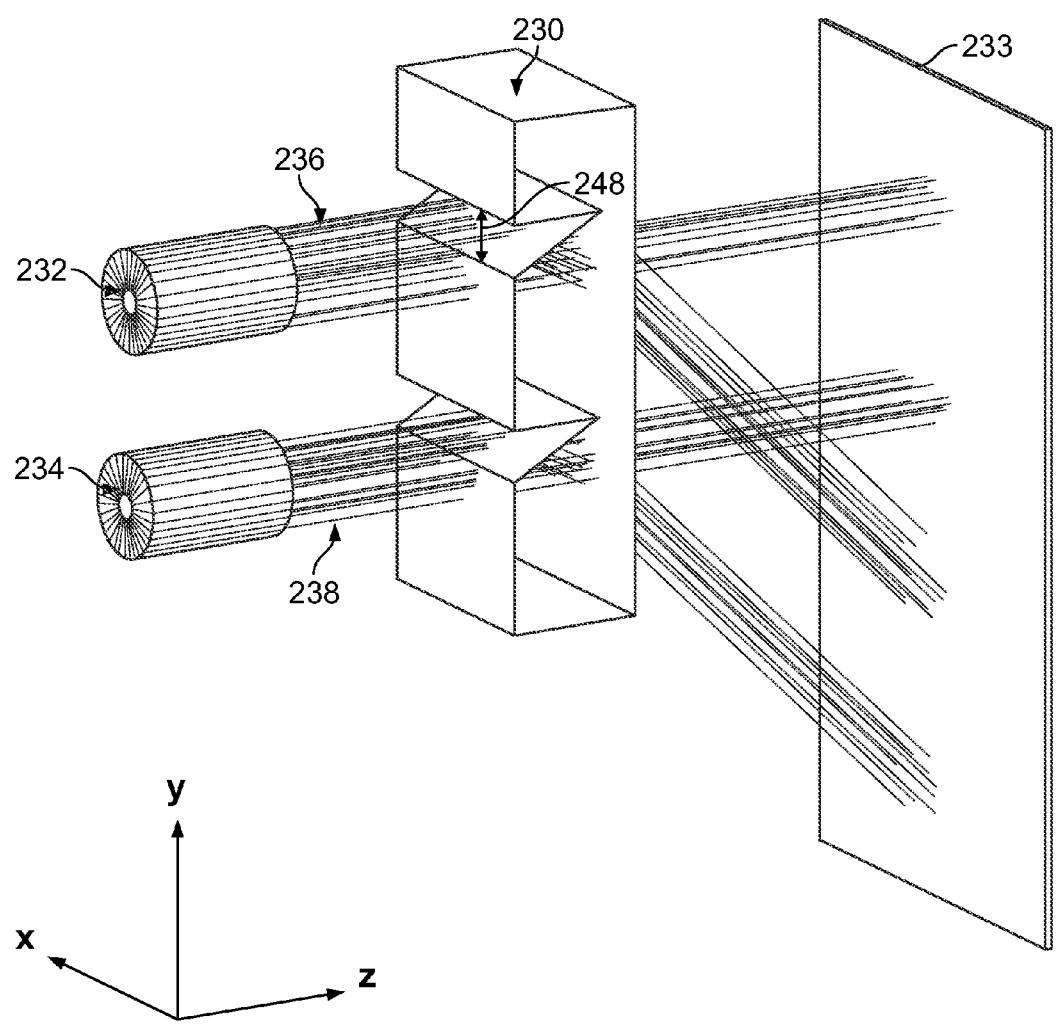
FIG. 11 illustrates an isometric view of a refractive beam splitter in accordance with an embodiment of the present invention.

FIGS. 10 and 11 illustrate 2D and isometric views, respectively, of a refractive beam splitter 230. LEDs or transmitters 232 and 234 transmit IR beams 236 and 238, respectively, toward the refractive beam splitter 230. The transmitters 232 and 234 are illustrated schematically as circular sources, and the IR beams 236 and 238 are transmitted parallel with respect to each other. The refractive beam splitter 230 splits each of the IR beams 236 and 238 into two portions; one portion is directed at zero degrees with respect to the transmit direction of the transmit IR beam, and one portion is directed (refracted) at 45 degrees with respect to the transmit direction of the transmit IR beam. For example, the IR beam 236 is split into a first portion 244 directed at zero degrees and a second portion 246 directed at 45 degrees. Both of the first and second portion 244 and 246 are transmit into touch area 241. Although the first and second portions 244 and 246 are illustrated as intersecting or terminating at line 231 in FIG. 10 and plane 233 in FIG. 11), it should be understood that in a touchscreen, the first and second portions 244 and 246 propagate within the touch area 241 and continue to IR receivers (not shown) on other edges of the touchscreen.

The refractive beam splitter 230 may be formed of a sheet of polymer material having a plurality or array of notches, prisms or deflecting elements 240 and 242 along front wall 243. In this example, inner surfaces of the deflecting elements 240 and 242 are not coated. Each IR transmitter 232 and 234 may be aligned with respect to a corresponding deflecting element 240 and 242. By way of example, the deflecting element 240 receives the IR beam 236. The portion of the IR beam 236 that interfaces with slanted facet 247 is refracted a first time. The refracted beam then interfaces with back wall 249 of the refractive beam splitter 230 at an angle that is not 90 degrees. The refracted beam is refracted a second time, creating the second portion 246. The exit refraction angle (after the second portion 246 exits the back wall 249) is at 45 degrees with respect to the first portion 244, which is parallel to the transmit direction of the IR beam 236.

By way of example, the IR transmitters 232 and 234 may be positioned at precise distances D1 apart from one another based on a desired level of resolution of the touchscreen 150 (as shown in FIG. 3). The deflecting elements 240 and 242 are positioned at precise distances D2 apart from one another. The distances D1 and D2 may correspond with each other to provide uniform alignment of the transmitters and deflecting elements along each side of the touchscreen 150.

The position of the IR transmitters and deflecting elements with respect to each other may be tuned to adjust the relative intensity or percentage of the first and second portions to one another. As illustrated, the transmitter 232 is aligned with respect to the deflecting elements 240 such that approximately one-half of the IR beam 236 is refracted at 45 degrees. By adjusting the alignment, a greater or lesser percentage of the IR beam 236 may be refracted.

Also, the relative intensity or percentage of the first and second portions 244 and 246 may be adjusted by increasing or decreasing the size of opening aperture 248 (FIG. 11) of the deflecting element. Optionally, the deflecting elements 240 and 242 may have different sizes of opening apertures 248, allowing different percentages of the IR beam 236 and 238 to be refracted. Optionally, the distances (such as distances D2) between the deflecting elements may vary to modify the percentages. Optionally, each IR transmitter may not have a corresponding deflecting element, allowing a corresponding IR beam to pass through the refractive beam splitter 230 without creating a refracted portion.

The transmitters 232 and 234 and refractive beam splitter 230 illustrate the transmit and beam splitting functionality. Not illustrated is the receive and beam combining functionality, which may be represented in reverse of the transmit function. Namely, the transmitters 232 and 234 may instead be receivers. The refractive beam splitter 230 receives at least two beams, in this example, one IR beam at 0 degrees and one IR beam at 45 degrees. Instead of splitting the beam, the refractive beam splitter 230 refracts the 45 degree beam to be parallel with the 0 degree beam which combines the two beams into a single beam.

IR beam splitters such as in FIGS. 10 and 11 may be fabricated by a variety of techniques, including injection molding, as well as using known optical film manufacturing techniques developed for the fabrication of brightness enhancing films used inside LCD construction. For example, an oligomeric resin composition may be cured on a plastic film and shaped by a master negative molding. Additionally, in some cases optical films developed for use in LCD assemblies may have desirable beam-splitting properties and may be used in the design of IR XYU touchscreens.

Figure 12:
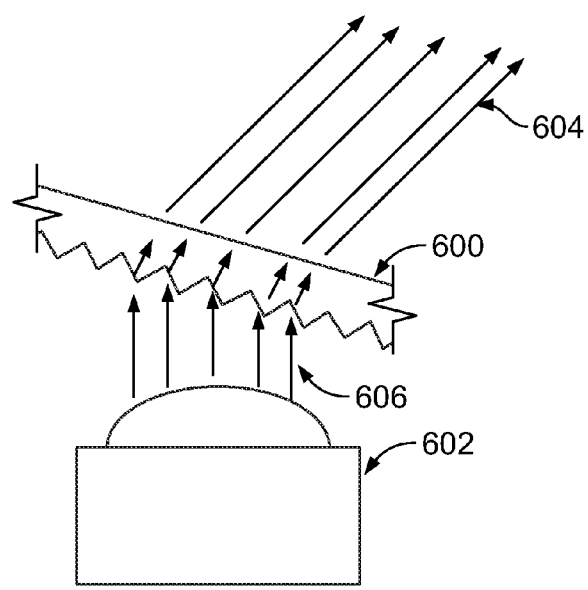
FIG. 12 illustrates in plan view an example of an optical film that may be used to form an IR beam splitter in accordance with an embodiment of the present invention.

FIG. 12 illustrates in plan view an optical film 600 that has the aforementioned deflecting element structure positioned proximate to an IR transmitter 602. An IR beam 606 enters the film 600 and is deflected a first time at a first angle, then is deflected a second time at a second angle upon leaving the film 600. If the total deflection is less than 45 degrees for normal incidence, the film 600 may be rotated as illustrated to produce deflected beam 604 that has 45 degree deflection with respect to the IR beam 606. In this example, however, such commercially available optical films as film 600 typically deflect all incident light.

Figure 13:
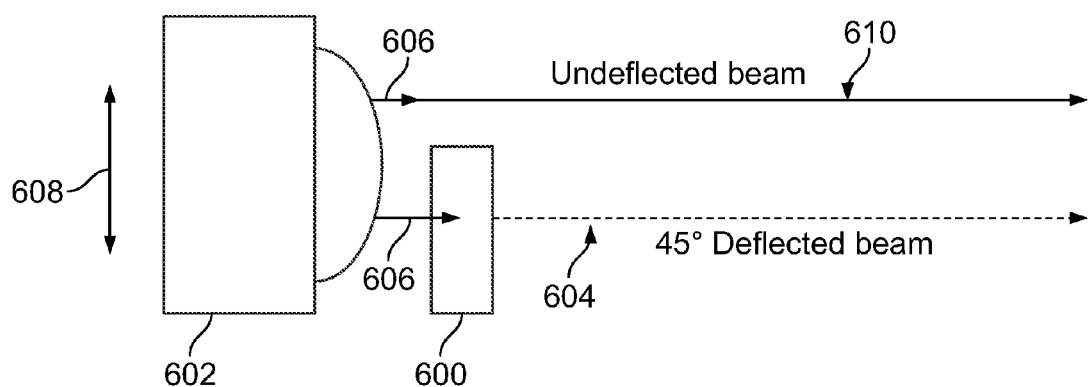
FIG. 13 illustrates in side view positioning the optical film of FIG. 12 to intercept a portion of an IR beam in accordance with an embodiment of the present invention.

FIG. 13 illustrates an embodiment wherein the film 600 is positioned to intercept a portion of the IR beam 606. The film 600 may be positioned with respect to the IR transmitter 602 along the direction of arrow 608, such as to intercept approximately one-half of the IR beam 606. In this example, a portion or approximately one-half of the IR beam 606 would then be transmitted as an undeflected X or Y beam 610, and the remaining one-half of the IR beam 606 would be transmitted as the deflected beam 604. The direction of the deflected beam 604 is determined by the properties of the film 600 and may instead by deflected at −45 degrees.

Figure 14:
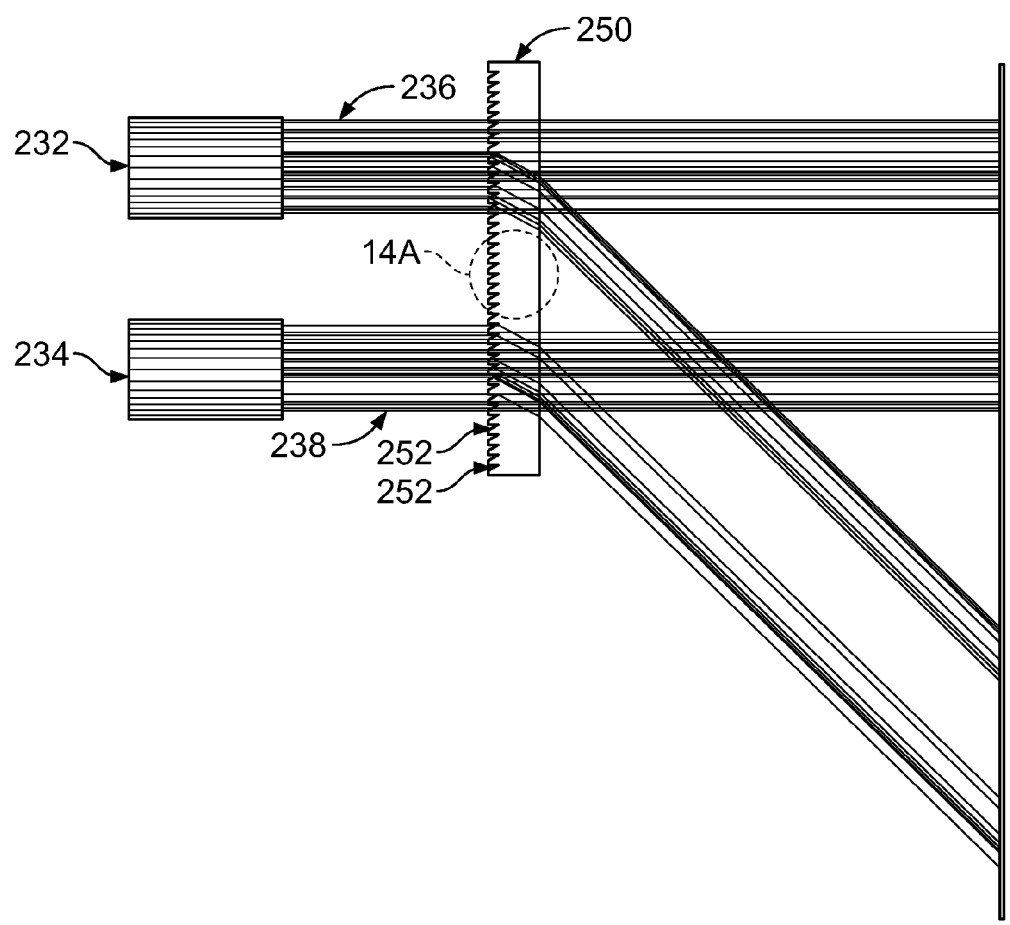
FIG. 14 illustrates a 2D view of a refractive beam splitter in accordance with an embodiment of the present invention.
Figure 14A:
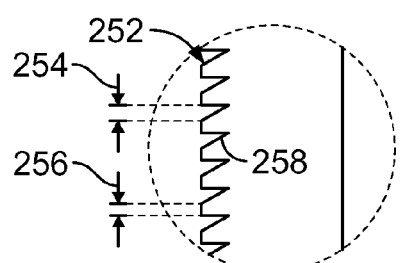
Figure 15:
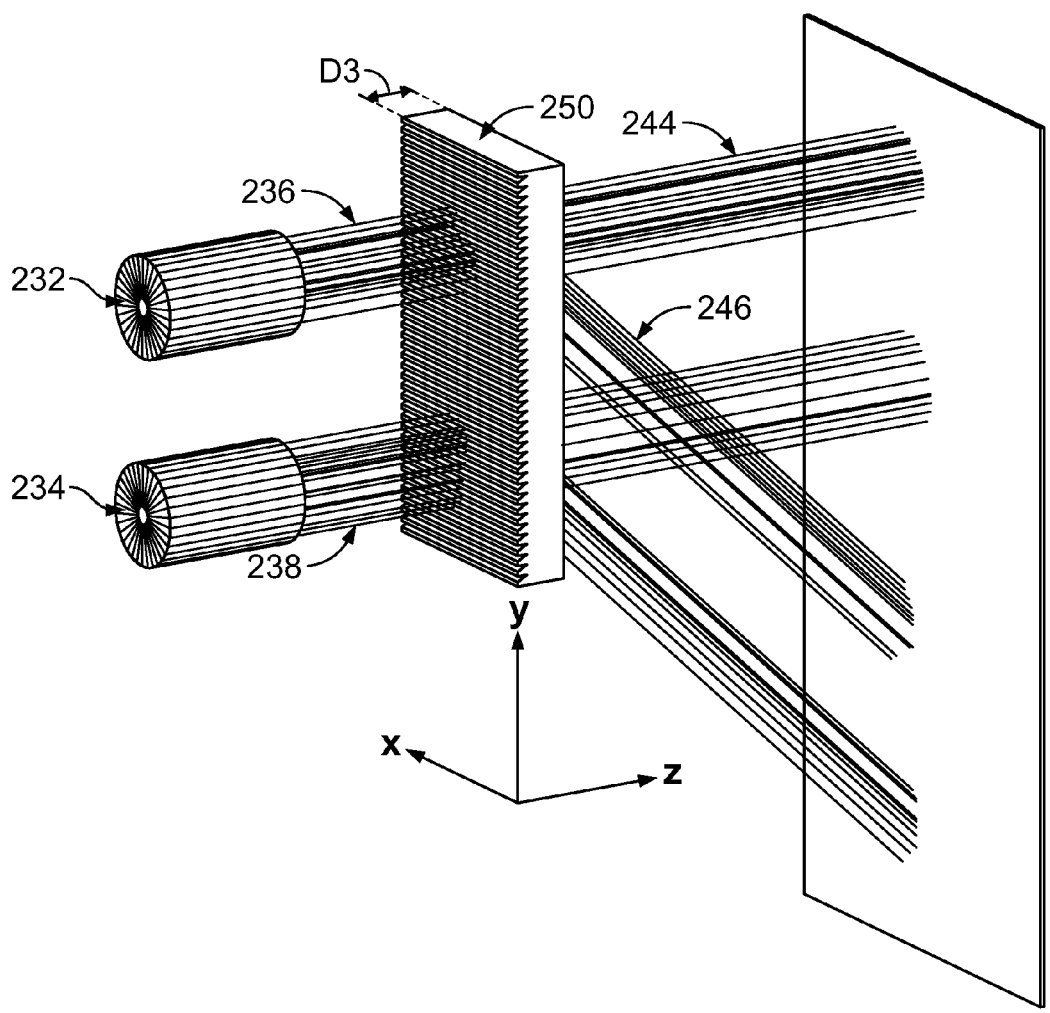
FIG. 15 illustrates an isometric view of a refractive beam splitter in accordance with an embodiment of the present invention.

FIGS. 14 and 15 illustrate 2D and isometric views, respectively, of a refractive beam splitter 250. The IR transmitters 232 and 234 are illustrated along with the respective IR beams 236 and 238. As with the refraction beam splitter 230 of FIG. 10, the refractive beam splitter 250 also splits the IR beams 236 and 238 into the first portion 244 directed at zero degrees and the second portion 246 directed at 45 degrees.

In this example, the proportions of the deflecting elements 240 and 242 of FIG. 10 may be retained in a plurality or array of deflecting elements 252 of the refractive beam splitter 250, although the sizes and spacing may change. The refractive beam splitter 250 has a great number of deflecting elements 252 that are smaller and are more finely spaced with respect to each other. In other words, the refractive beam splitter 230 of FIG. 10 may be modified with a higher density of small refractive facets to form the refractive beam splitter 250 of FIG. 14.

When the deflecting elements 252 are closely spaced, the IR transmitters 232 and 234 do not need to be aligned with the deflecting elements 252. Also, the refractive beam splitter 250 may be made arbitrarily thin along dimension D3 (FIG. 15), or may be made thinner than the refractive beam splitter 230 which has larger and/or deeper deflecting elements 240 and 242.

The relative intensity of the first and second portions 244 and 246 may be adjusted by increasing or decreasing the ratio of slanted facet aperture 254 to facet spacing 256. Elements that may be modified are the slanted facet aperture 254 of slanted facet 258, the ratio of the slanted facet aperture 254 to facet spacing 256, the number of deflecting elements 252, the height, length, width and refractive index of the refractive beam splitter 250, and the final direction of the refracted beam (the second portion 246).

Figure 16:
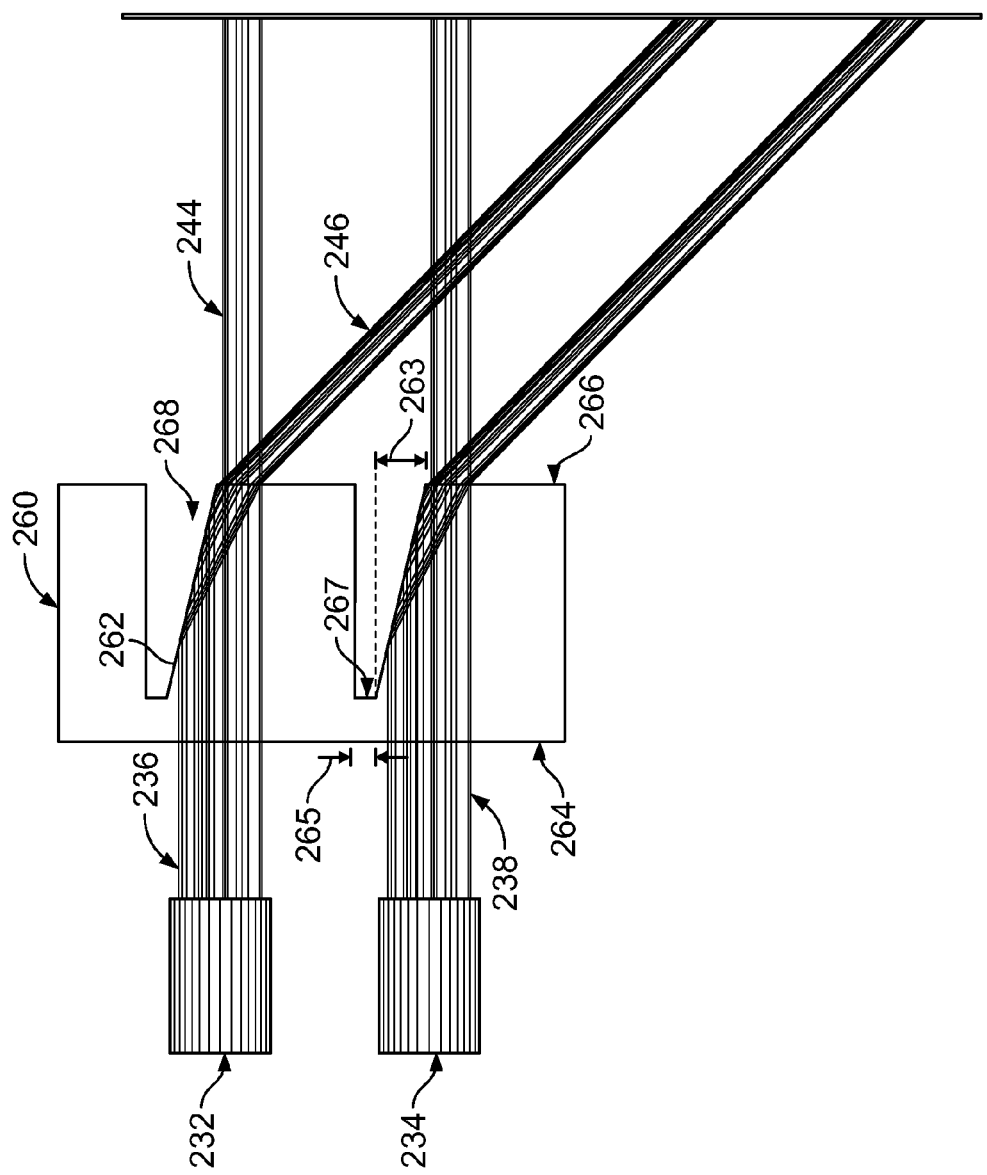
FIG. 16 illustrates a 2D view of reflective beam splitter in accordance with an embodiment of the present invention.
Figure 17:
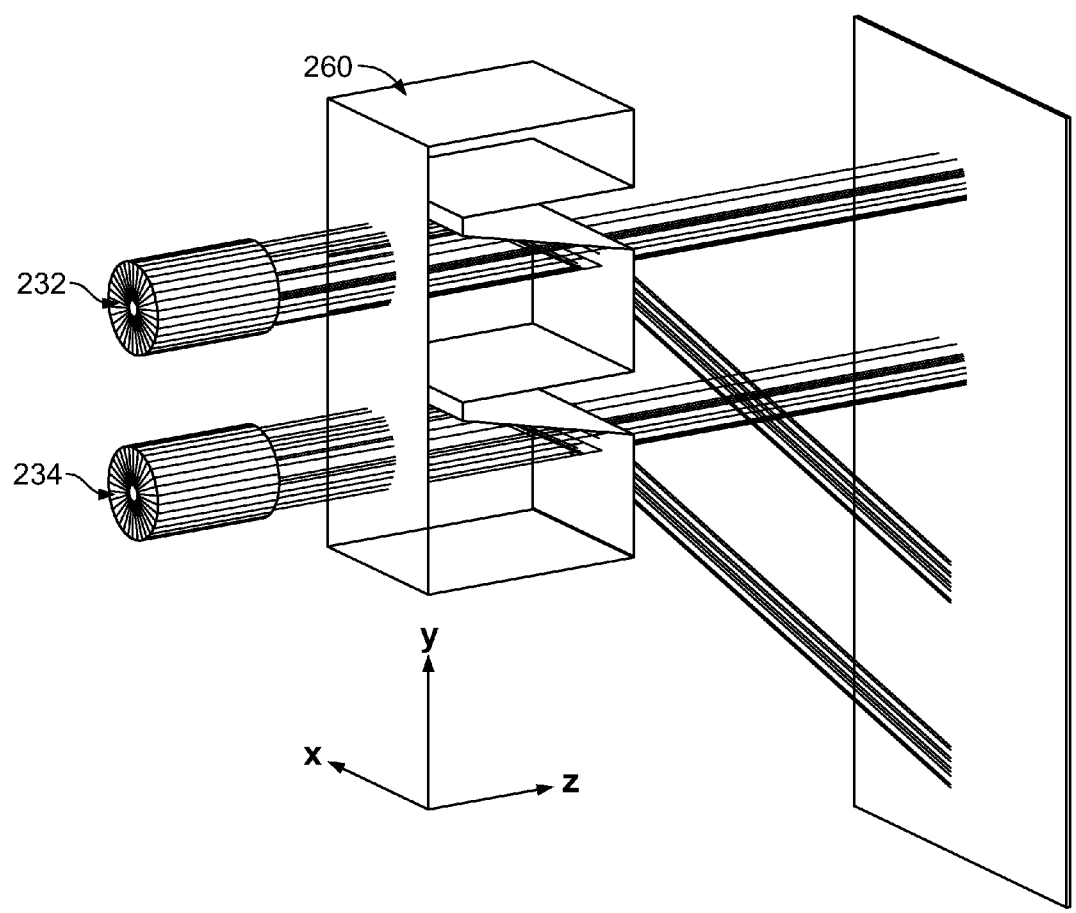
FIG. 17 illustrates an isometric view of the reflective beam splitter of FIG. 16 in accordance with an embodiment of the present invention.

FIGS. 16 and 17 illustrate 2D and isometric views, respectively, of reflective (and refractive) beam splitter 260. In comparison with the refractive beam splitter 230 of FIG. 10, the reflective beam splitter 260 has mirrored slanted facets 262 instead of the uncoated slanted facets 247. Also, an array of deflecting elements 268 is formed in back wall 266 rather than in front wall 264.

The IR beam 236 enters the reflective beam splitter 260 through the front wall 264. Portions of the IR beam 236 that interface with the mirrored slanted facets 262 are reflected. When the reflected beam encounters the back wall 266 at an angle that is not 90 degrees, the reflected beam is then refracted. The reflected and refracted beam is the second portion 246 being transmitted at 45 degrees with respect to the IR beam 236. Portions of the IR beam 236 that interface with the back wall 266 at 90 degrees pass through the reflective beam splitter 260 without being deflected to form the first portion 244 at zero degrees with respect to the IR beam 236.

The relative intensity of the zero and 45 degree beams (first and second portions 244 and 246) may be adjusted by increasing or decreasing mirrored facet aperture 263, and/or by adjusting the relative position or alignment of the transmitters 232 and 234 with respect to the mirrored slanted facets 262. In other words, the transmitters 232 and 234 are carefully aligned with the mirrored slanted facets 262 of the reflective beam splitter 260 to divide the IR beam 236 into the desired percentages of zero and 45 degree beams as previously discussed with FIG. 10. Elements may again be modified, such as the height (or mirrored facet aperture 263) of the mirrored slanted facet 262, the height 265 of clear or unmirrored facet 267 immediately above the mirrored slanted facet 262, the number and spacing of deflecting elements 268, the height, length, and width of the reflective beam splitter 260, the material comprising the reflective beam splitter 260 that may be used to change the refractive index, and the final direction of the refracted beam (second portion 246) which may be different than 45 degrees.

Figure 18:
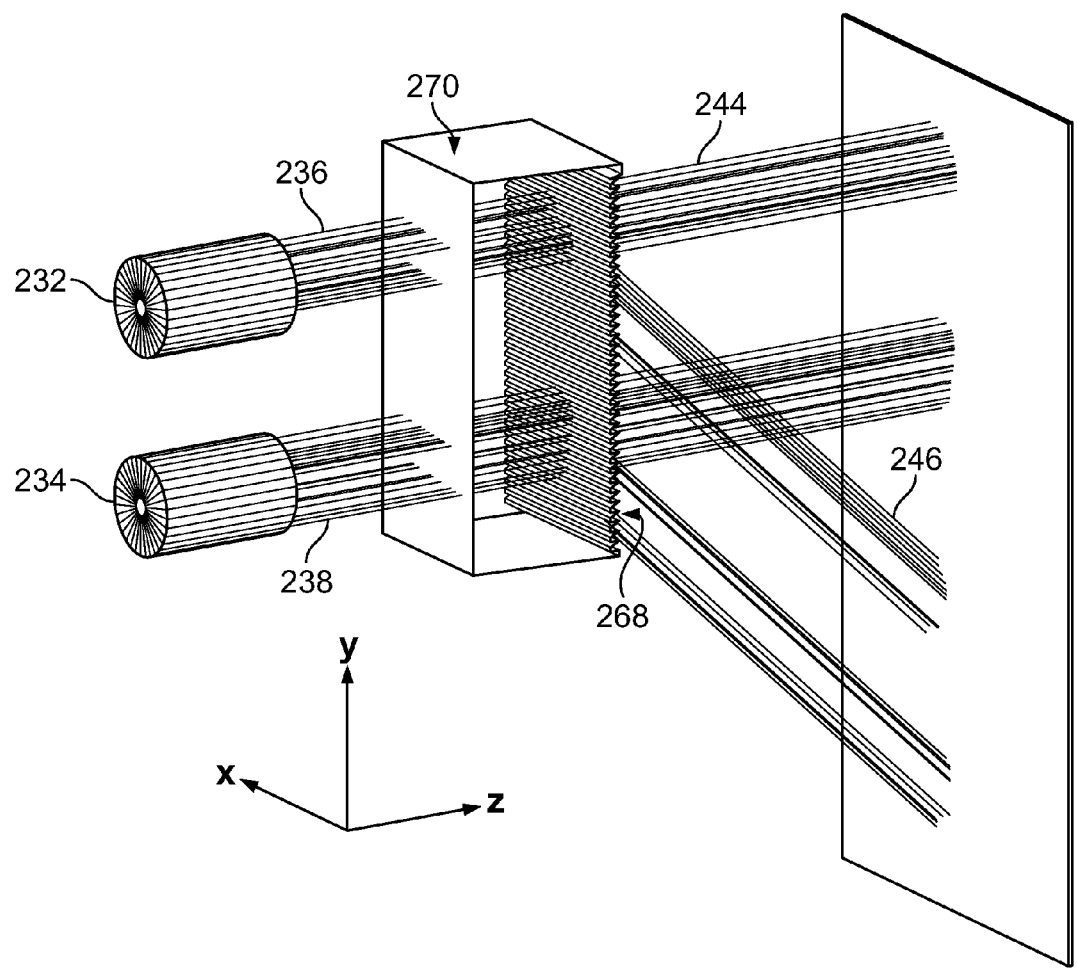
FIG. 18 illustrates an isometric view of a reflective beam splitter which has a large number of small deflecting elements in accordance with an embodiment of the present invention.

FIG. 18 illustrates an isometric view of a reflective beam splitter 270 that has a large number of small mirrored surfaces. As discussed previously, the geometry of the deflecting elements, such as the deflecting elements 240 and 242 of FIG. 10, may be retained while the scaling is changed to form a beam splitter having the smaller deflecting elements 252 (as shown in FIGS. 14 and 15) that are closer together. Using a higher density of smaller deflecting elements 268 in FIG. 18, the transmitters 232 and 234 do not have to be aligned with an individual deflecting element or mirrored slanted facet 262 as shown in FIG. 16. The reflective beam splitter 270 splits the IR beam 236 into the first portion 244 at zero degrees and the second portion 246 at 45 degrees. Also, the relative intensity of the zero degree and 45 degree beams may be adjusted as previously discussed in FIGS. 16 and 17.

Figure 19:
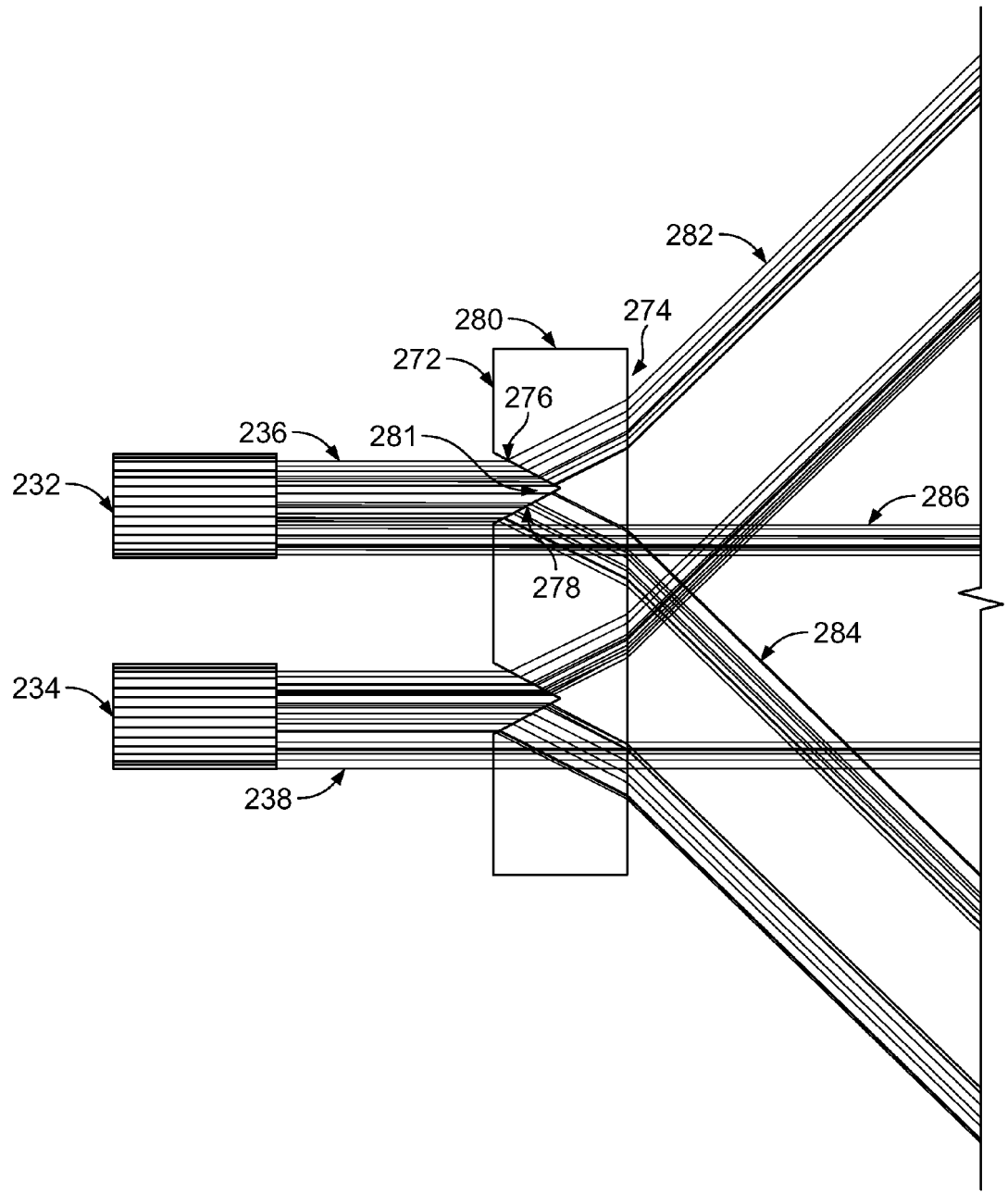
FIG. 19 illustrates a refractive beam splitter that splits an incident IR beam into more than two beams in accordance with an embodiment of the present invention.

FIG. 19 illustrates a refractive beam splitter 280 that splits an incident IR beam into more than two beams. The refractive beam splitter 280 has an array of deflecting elements 281 along front wall 272. Each of the deflecting elements 281 has a first and second slanted facet 276 and 278 which are slanted at directions opposite with respect to each other. Portions of the IR beam 236 that interface with the first and second slanted facets 276 and 278 are refracted a first time and then are refracted a second time as the refracted beam interfaces with back wall 274. Portions of the IR beam 236 that interface with the front and back walls 272 and 274 at 90 degrees are not deflected. The refractive beam splitter 280 therefore splits the IR beam 236 into a first beam 282 directed at −45 degrees, a second beam 284 directed at +45 degrees, and a third beam 286 directed at zero degrees, all with respect to the direction of the IR beam 236. In some embodiments, such as a sensor with X, U and V beams, but not Y beam, the refractive beam splitter 280 may be designed so that there is no undeflected beam (or third beam 286) and the incident IR beams 236 is entirely intercepted by the first and second slanted facets 276 and 278.

The deflecting elements 281 of the refractive beam splitter 280 as illustrated are aligned with the IR transmitters 232 and 234. However, as discussed previously, the deflecting elements 281 may be made smaller and closer together, allowing the touchscreen to be assembled without aligning the transmitters and receivers with the deflecting elements 281.

Figure 20:
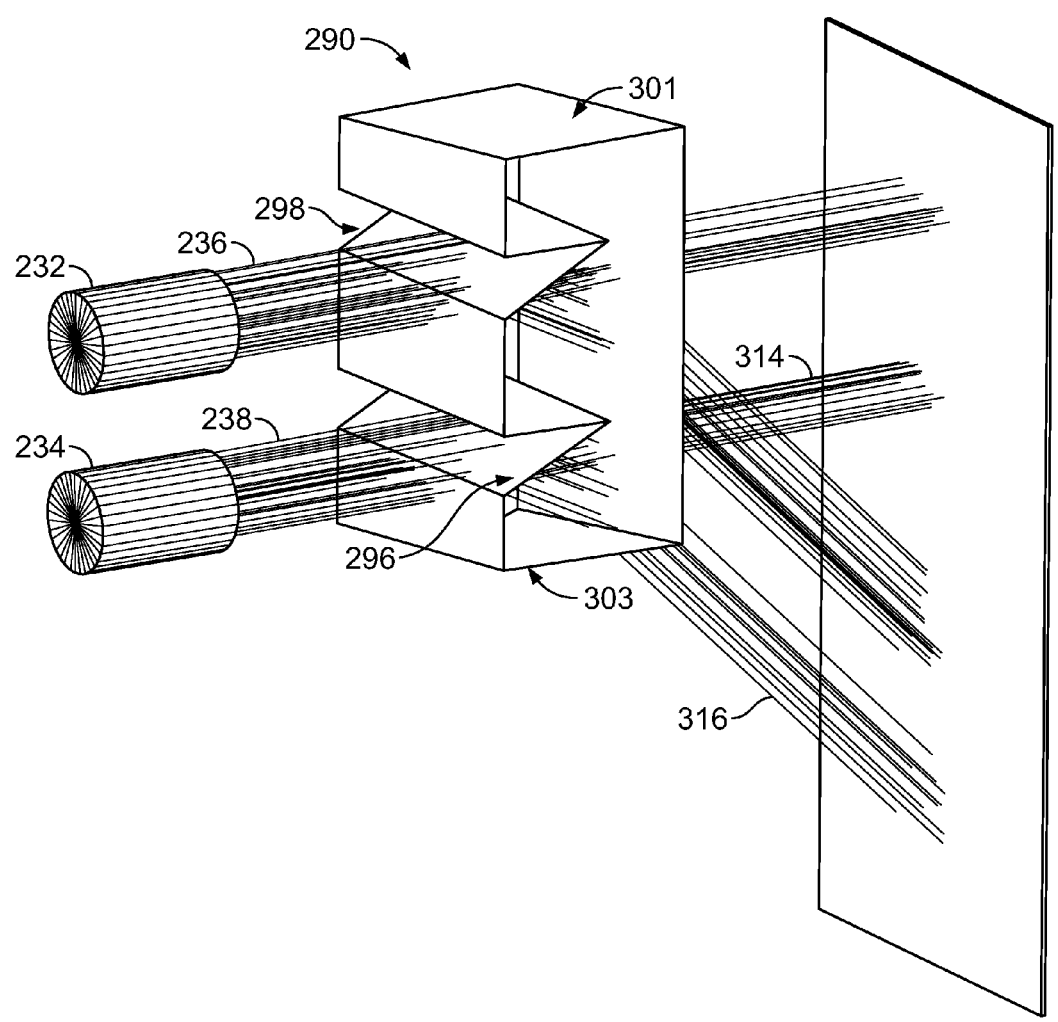
FIG. 20 illustrates a tilted refractive beam splitter having deflecting elements that are formed to create incoming and outgoing surfaces that are tilted rather than perpendicular with respect to the incoming IR beam in accordance with an embodiment of the present invention.
Figure 21:
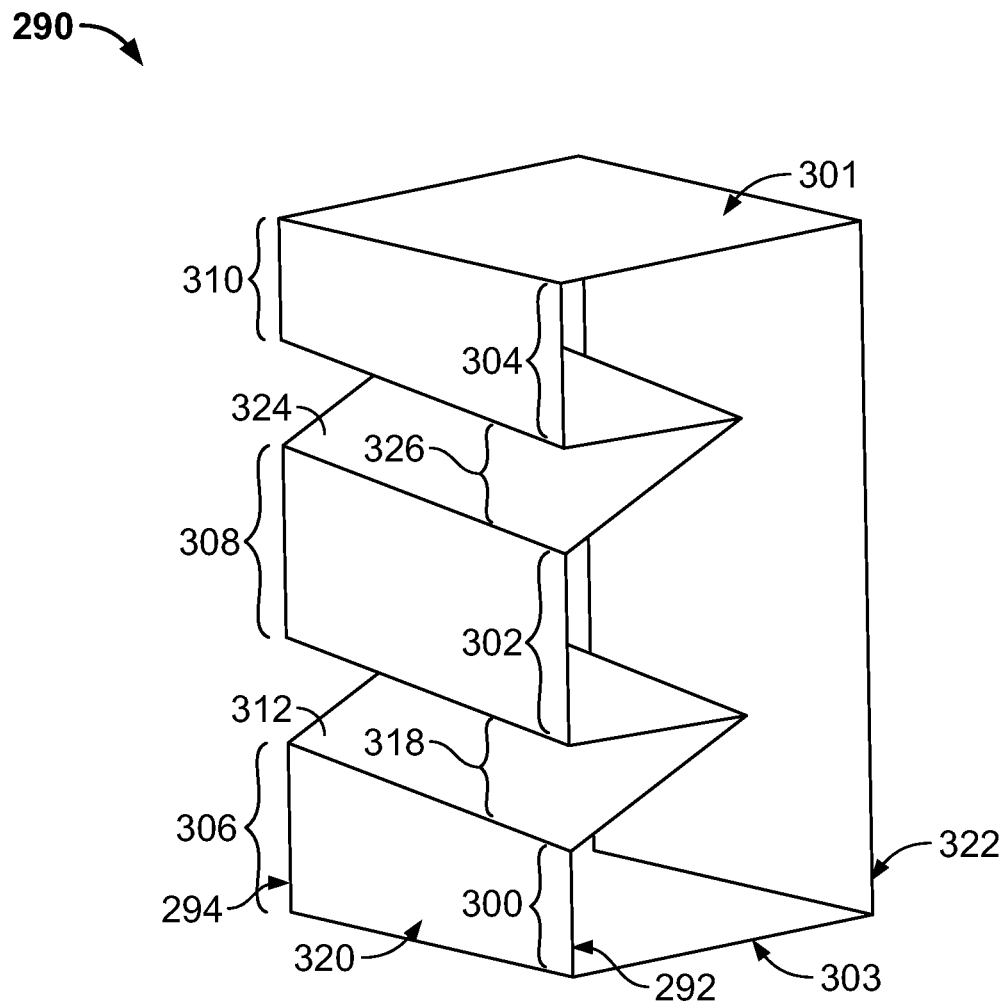
FIG. 21 illustrates the tilted refractive beam splitter of FIG. 20 in accordance with an embodiment of the present invention.

FIG. 20 illustrates a tilted refractive beam splitter 290 having deflecting elements that are formed to create incoming and outgoing surfaces that are tilted rather than perpendicular with respect to the IR beam. Tilting the incoming and outgoing surface may scatter any reflection outside the plane of the touch system, improving the removal of background. FIG. 21 illustrates the tilted refractive beam splitter 290 without IR beams for clarity. In both FIGS. 20 and 21, a short segment of a periodic beam splitter structure between imaginary horizontal planes 301 and 303 is shown.

First and second deflecting elements 296 and 298 are formed in front wall 320, as well as first side wall 292 and second side wall 294, which refer to the surfaces illustrated vertically. The intersection of front wall 320 and first side wall 292 has first, second and third portions 300, 302, and 304, and the intersection of the front wall 320 and the second side wall 294 has first, second and third portions 306, 308 and 310. The first deflecting element 296 is formed between the first and second portions 300 and 302 of the first side wall 292 and first and second portions 306 and 308 of the second side wall 294. The second deflecting element 298 is formed between the second and third portions 302 and 304 of the first side wall 292 and the second and third portions 308 and 310 of the second side wall 294.

The bottom of the first portion 300 of the first side wall 292 and the bottom of the first portion 306 of the second side wall 294 both start at the imaginary horizontal plane 303. The first portion 300 of the first side wall 292 is shorter than the first portion 306 of the second side wall 294. Incoming surface 312 of the first deflecting element 296 is thus angled to tilt or slant away from the vertical direction. Facet aperture 318 does not vary across the width of the first deflecting element 296, but is tilted with respect to the horizontal. The parallel incident IR beam 238 is split into a zero degree beam 314 and a 45 degree beam 316.

Similarly, the top of the third portion 304 of the first side wall 292 and the top of the third portion 310 of the second side wall 294 both start at the imaginary horizontal plane 301. The third portion 304 of the first side wall 292 is longer than the third portion 310 of the second side wall 294. The second portions 302 and 308 of the first and second side walls 292 and 294, respectively, are of equal length. Incoming surface 324 of the second deflecting element 298 is thus angled, and the facet aperture 326 does not vary across the width of the second deflecting element 298.

Relative intensity of the zero and 45 degree beams 314 and 316 may be adjusted by increasing or decreasing the refractive facet aperture 318 and/or by alignment of the transmitters 234 and 232 with respect to the first and second deflecting elements 296 and 298, respectively. The angle of tilt or the slant of the front and rear walls 320 and 322 may be modified, as well as one or more of the aperture of the refractive facet, the height of the clear facet immediately above the refractive facet, the number and spacing of deflecting elements, the height, length, width, and refractive index of the beam splitter material block, and the final direction of the refracted beam, which in this example is the 45 degree beam 316.

Therefore, any portion of the IR beam 238 that enters the tilted refractive beam splitter 290 along the front wall 320 will exit the rear wall 322 at zero degrees. Although the zero degree beam 314 is refracted at both of the front and rear walls 320 and 322, as long as the front and rear walls 320 and 322 are parallel with respect to each other there is no net deflection. Thus, if the front and rear walls 320 and 322 are parallel, an outgoing beam exits the rear wall 322 at the same direction as the incident beam.

The portion of the IR beam 238 that enters the tilted refractive beam splitter 290 along a refractive surface of the first deflecting element 296 is refracted a first time at a first angle. When the refracted IR beam exits the tilted refractive beam splitter 290 through the rear wall 322 that is parallel to the front wall 320, the refracted IR beam is refracted a second time to achieve the desired overall refracted angle, in this example, 45 degrees. Hence, there are two separate refractions by slanted interfaces to consider.

Figure 22:
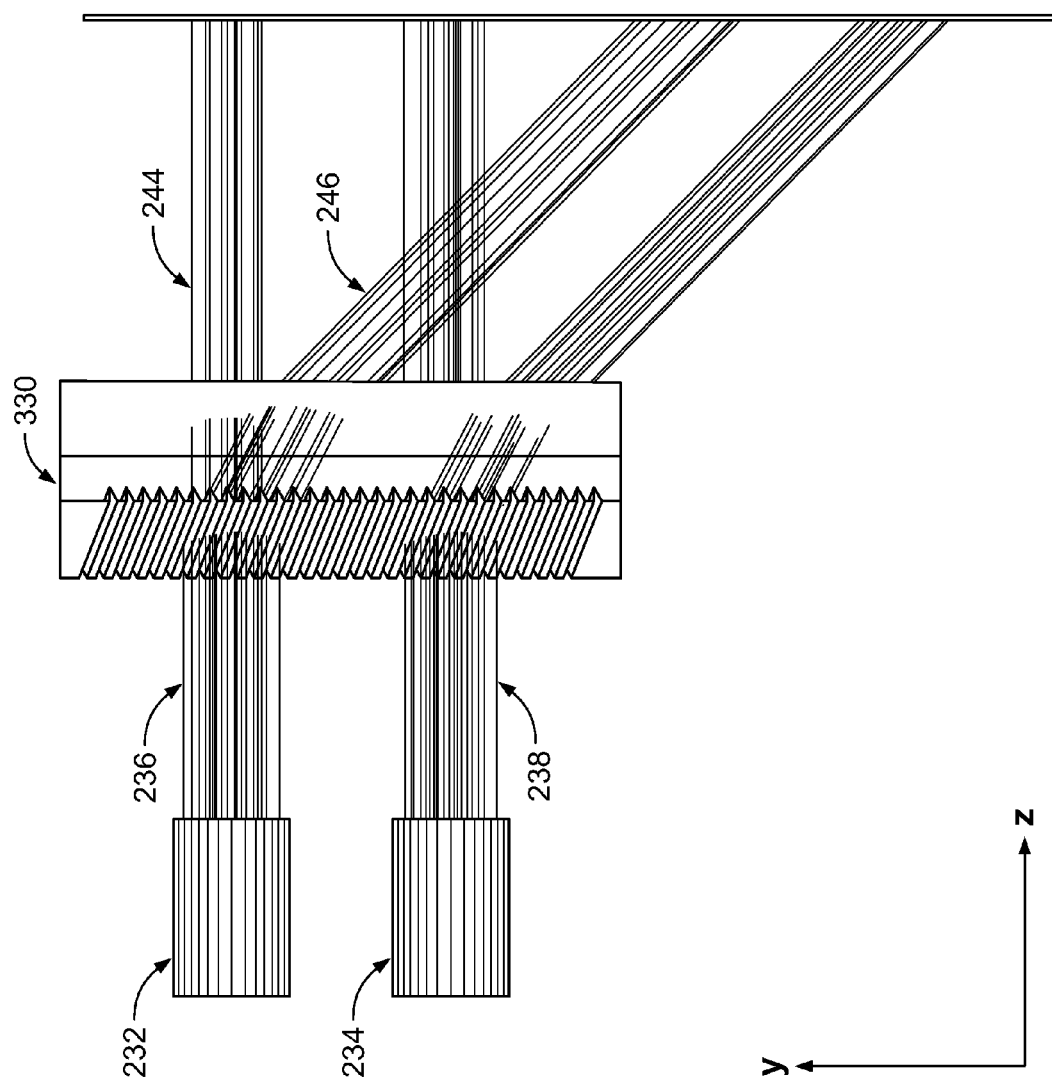
FIG. 22 illustrates a 2D view of a tilted refractive beam splitter having a high density of small refractive facets in accordance with an embodiment of the present invention.
Figure 23:
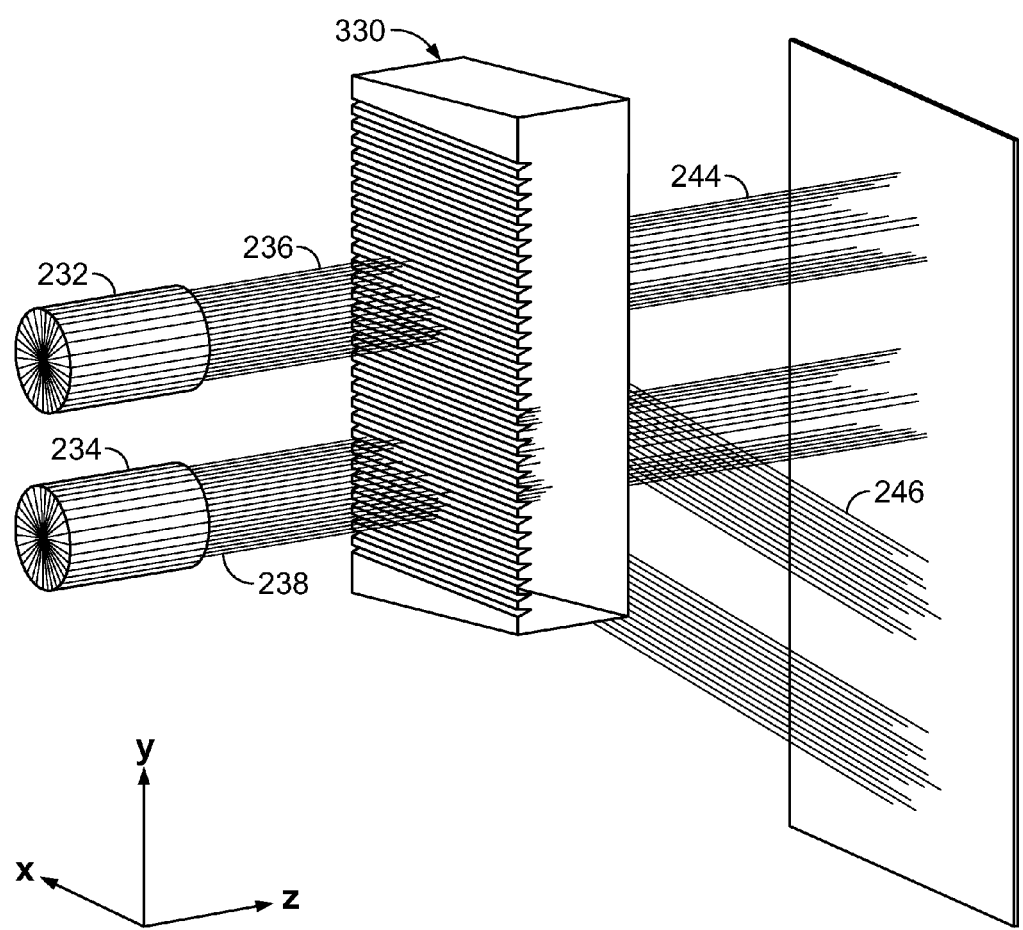
FIG. 23 illustrates an isometric view of a tilted refractive beam splitter having a high density of small refractive facets in accordance with an embodiment of the present invention.

FIGS. 22 and 23 illustrate 2D and isometric views, respectively, of a tilted refractive beam splitter 330 having a high density of small refractive facets. The tilted refractive beam splitter 330 may have deflecting elements that have the same geometry as the tilted refractive beam splitter 290 of FIG. 20, but that deflecting elements are smaller in size and more closely spaced with respect to each other. Therefore, there is no need to align the transmitters 232 and 234 with respect to the individual deflecting elements. The tilted refractive beam splitter 330 also splits parallel IR beam 236 into a first portion 244 directed at zero degrees and a second portion 246 directed at 45 degrees. The relative intensity of the zero and 45 degree beams may be adjusted by increasing or decreasing the ratio of the refractive facet aperture to the aperture of the other facets.

Figure 24:
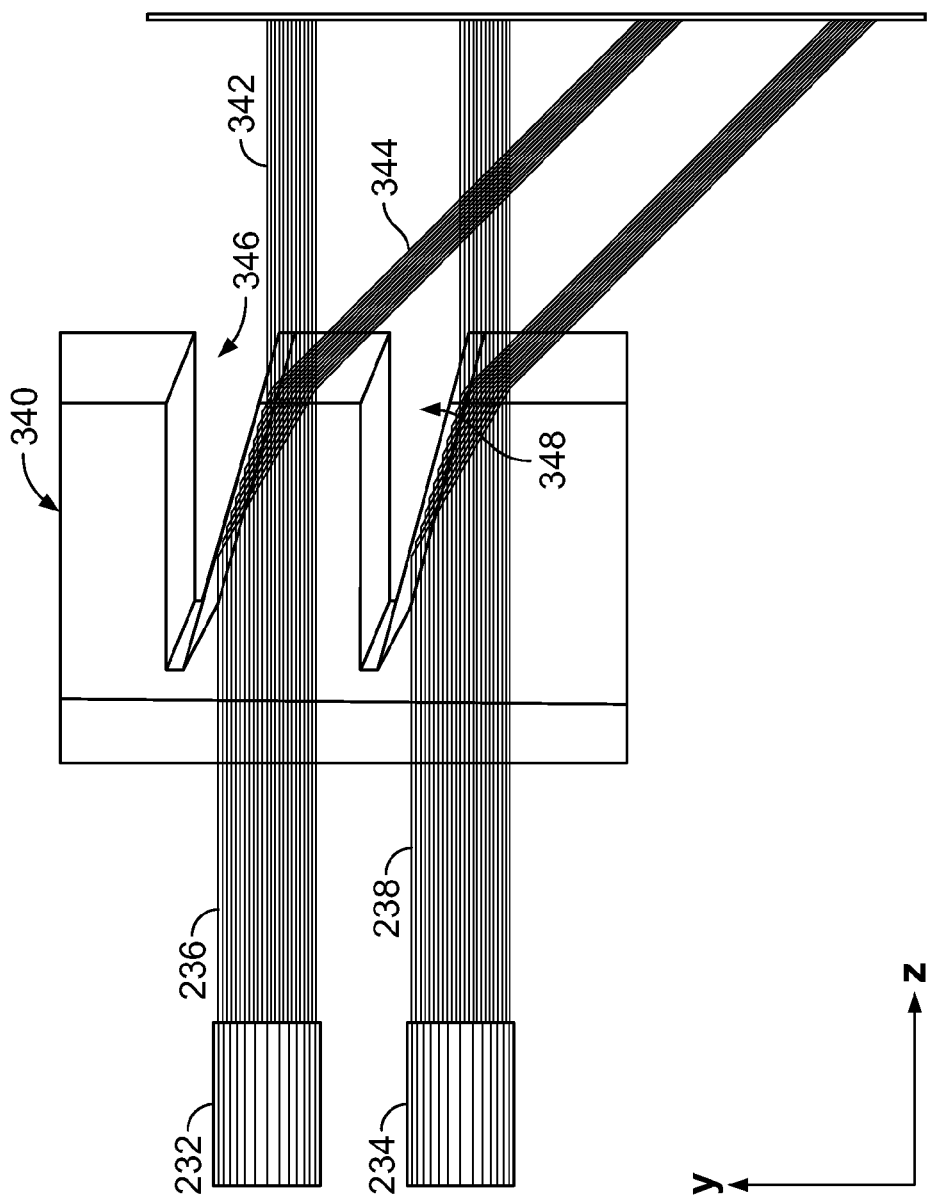
FIG. 24 illustrates a 2D view of a reflective tilted beam splitter which splits a parallel incident light beam into zero degree and 45 degree beams in accordance with an embodiment of the present invention.

As with previously described beam splitters, reflection may be used rather than refraction. FIG. 24 illustrates a 2D view of a reflective tilted beam splitter 340 that splits the parallel incident light beam (the IR beam 236) into a zero degree beam 342 and a 45 degree beam 344. The relative intensity of the zero and 45 degree beams 342 and 344 is adjusted by increasing or decreasing the mirrored facet aperture and/or by alignment of the transmitters 232 and 234 with respect to the individual deflecting elements 346 and 348, respectively. Other aspects may also be adjusted, including the angle of tilt or slant of the front and rear walls, the aperture of the mirrored facet, the height of the clear facet immediately above the mirrored facet, the number and spacing of deflecting elements, the height, length, width, and refractive index of the beam splitter material, and the final direction of the split beam, which is 45 degrees in this example.

Figure 25:
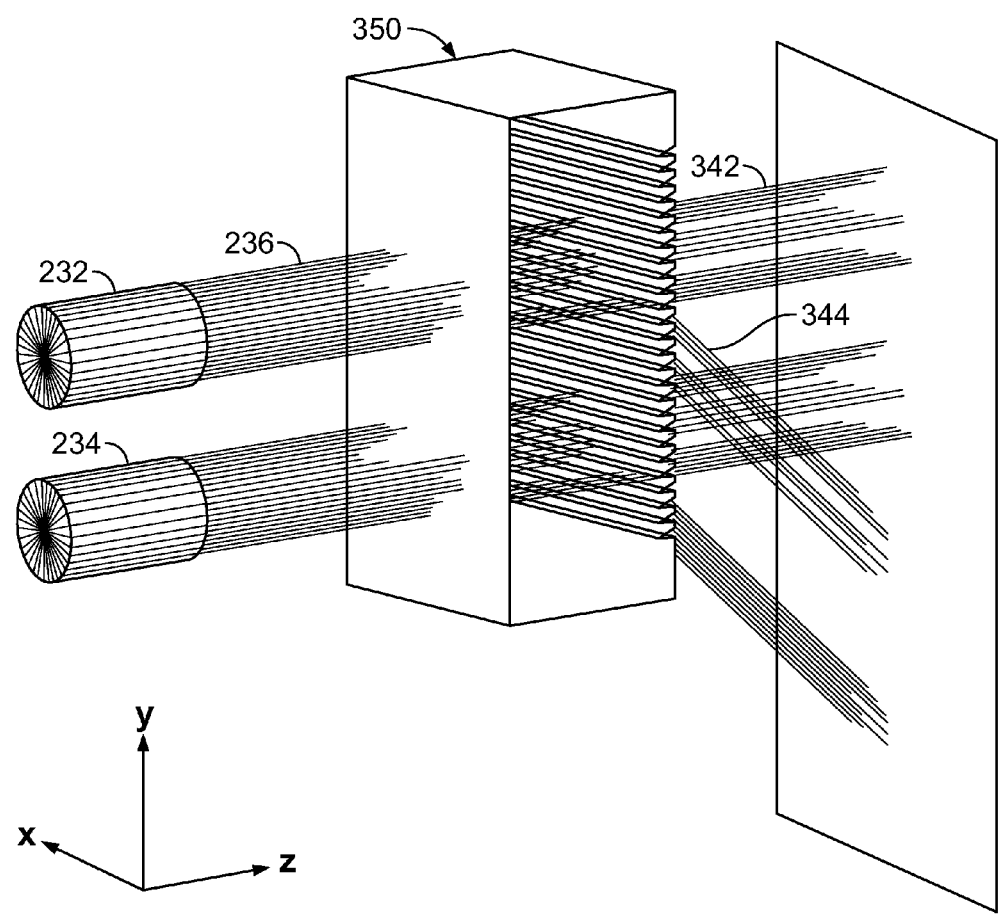
FIG. 25 illustrates a reflective tilted beam splitter having a high density of small mirrored facets in accordance with an embodiment of the present invention.

FIG. 25 illustrates a reflective tilted beam splitter 350 having a high density of small mirrored facets. As with the other beam splitters previously discussed, the reflective tilted beam splitter 350 also splits parallel incident light beam (the IR beam 236) into the zero degree beam 342 and the 45 degree beam 344. The relative intensity of the zero and 45 degree beams is adjusted by increasing or decreasing the ratio of the mirrored facet aperture to the aperture of the remaining facets. The other relative geometry remains the same as described above with the reflective tilted beam splitter 340 in FIG. 24.

Each of the aforementioned IR transmitters has a lens that is typically used to focus the IR beam into a narrow forward cone in order to reduce IR beam power divergence as the beam propagates over a large touch area. Each of the IR receivers used with such IR transmitters has a lens that is typically used to focus an approximately parallel and forward incident IR beam into a small focal spot on the active detecting surface phototransistor. In one embodiment, the lens may be replaced with a beam splitting lens to accomplish the beam splitting function. In this configuration, a beam splitting lens is attached to each of the IR transmitters and IR receivers. The lens splits and combines IR beams for the IR XYU touchscreen operation. A separate beam splitter is not needed, and thus there is no need to align the IR transmitters and receivers with the beam splitters.

For simplicity, the following assumes that the internal LED light source (or phototransistor base) is a point source (or point detector), and that it is desired to generate parallel beams that diverge by 45 degrees as the beams are output from the beam splitting lens. To keep the lenses as symmetric as possible, the lens may split the light from a point source into +/−22.5 degree beams, rather than generating the zero and 45 degree beams as was accomplished with the beam splitters discussed previously. Therefore, a continuous lens surface is calculated to refract IR light from a point source into non-crossing +/−22.5 degree beams.

As a further simplification, it is assumed that the rear surface of the lens is flat, and that only the front surface of the lens is curved and may be either concave or convex in shape. Although it is possible to design Fresnel-type lenses that maintain fixed minimum and maximum thickness profiles, the following will assume continuously curved lens surface with no thickness constraints.

Figure 26:
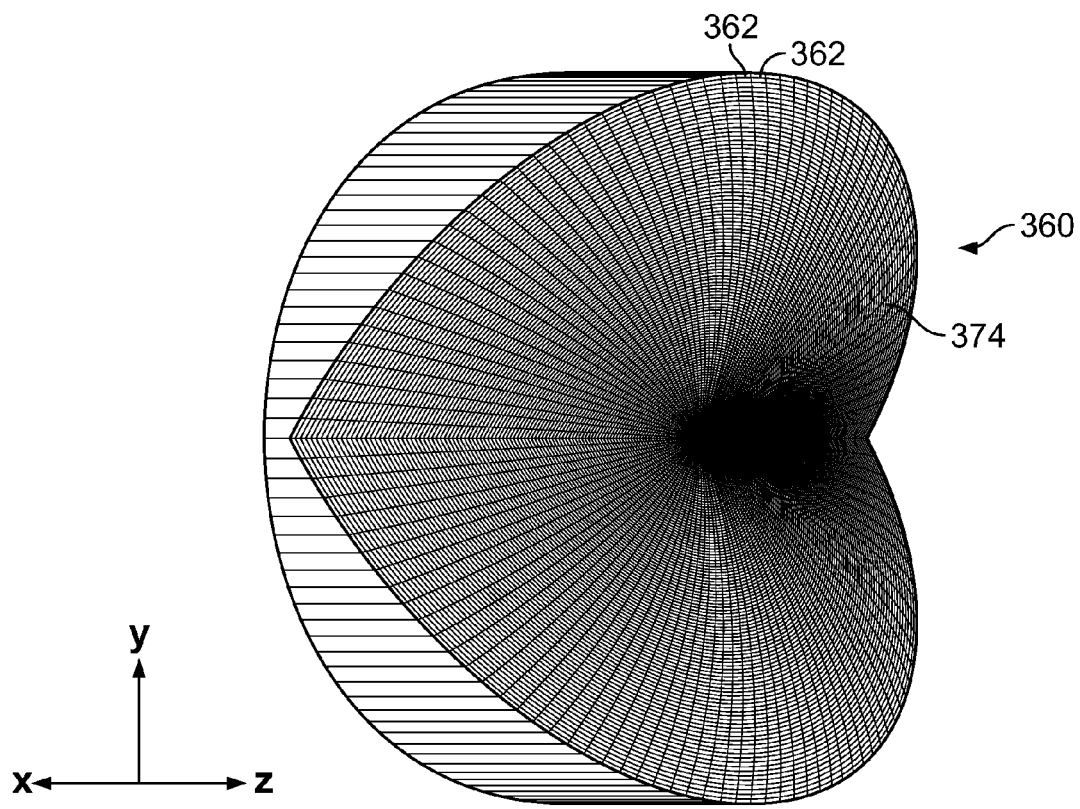
FIG. 26 illustrates a non-focusing concave lens formed in accordance with an embodiment of the present invention.
Figure 27:
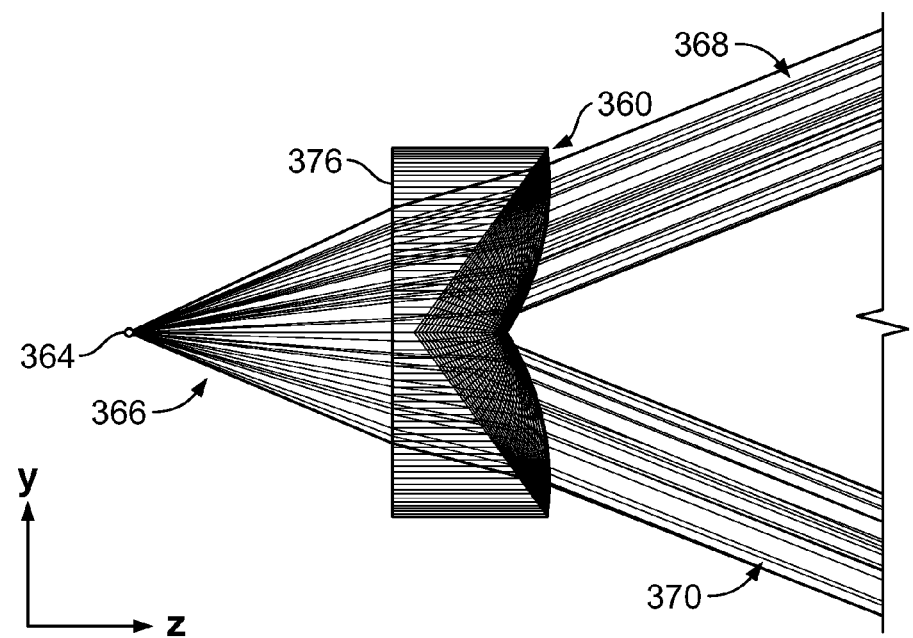
FIG. 27 illustrates the non-focusing concave lens of FIG. 26 in accordance with an embodiment of the present invention.

FIGS. 26 and 27 illustrate a non-focusing concave lens 360 that may be determined using standard analytical design methods. A front surface 374 of the non-focusing concave lens 360 is modeled using a large number of small flat facets 362. In FIG. 27, an IR point source 364 generates IR beam 366 that enters the non-focusing concave lens 360 through back surface 376. The non-focusing concave lens 360 splits the IR beam 366 into first and second beams 368 and 370.

Figure 28:
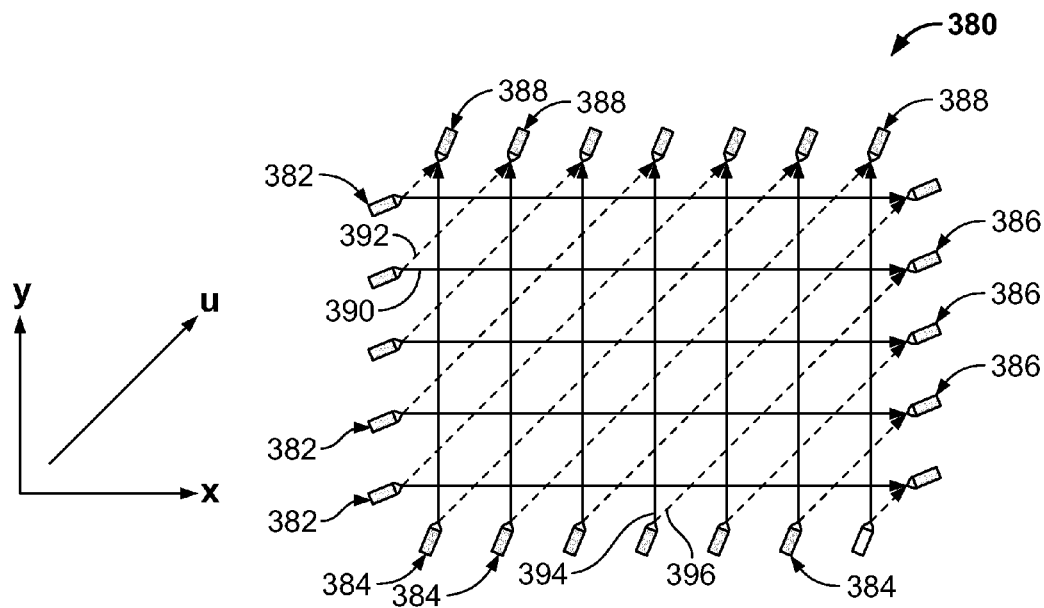
FIG. 28 illustrates a general concept for using a dual-beam lens in an IR touchscreen in accordance with an embodiment of the present invention.

FIG. 28 illustrates a general concept for using a dual-beam lens in an IR touchscreen 380. The dual-beam lens may be the non-focusing concave lens 360 (as shown in FIG. 27), or a focusing concave lens or convex lens, both of which are discussed below. IR transmitters 382 and 384 are positioned along two sides of the touchscreen 380, and IR receivers 386 and 388 are positioned along the other two sides of the touchscreen 380. For clarity, a small number of IR transmitters 382 and 384 and IR receivers 386 and 388 are illustrated, but typically a larger number of transmitters and receivers are used to provide uniform coverage over the entire touch area of the touchscreen 380.

Because the dual-beam lens forms beams at +/−22.5 degrees rather than at zero degrees and 45 degrees, the IR transmitters 382 and 384 and the IR receivers 386 and 388 are positioned at rotated orientations with respect to the X and Y planes of the touchscreen 380 to form and receive X, Y and U beams. The angle is determined such that one beam is transmitted along either the X or Y direction. For example, the transmitters 382 are angled to transmit IR beams 390 along the X axis and IR beams 392 along the U axis. The transmitters 384 are angled to transmit IR beams 394 along the Y axis and IR beams 396 along the U axis. The IR receivers 386 are angled to detect the IR beams 390 and 396, and the IR receivers 388 are angled to detect the IR beams 392 and 394. Because the U beams are at 45 degrees while the diagonal of the touch area is not, in some cases, U beams propagate from IR transmitters 384 to IR receivers 388.

Figure 29:
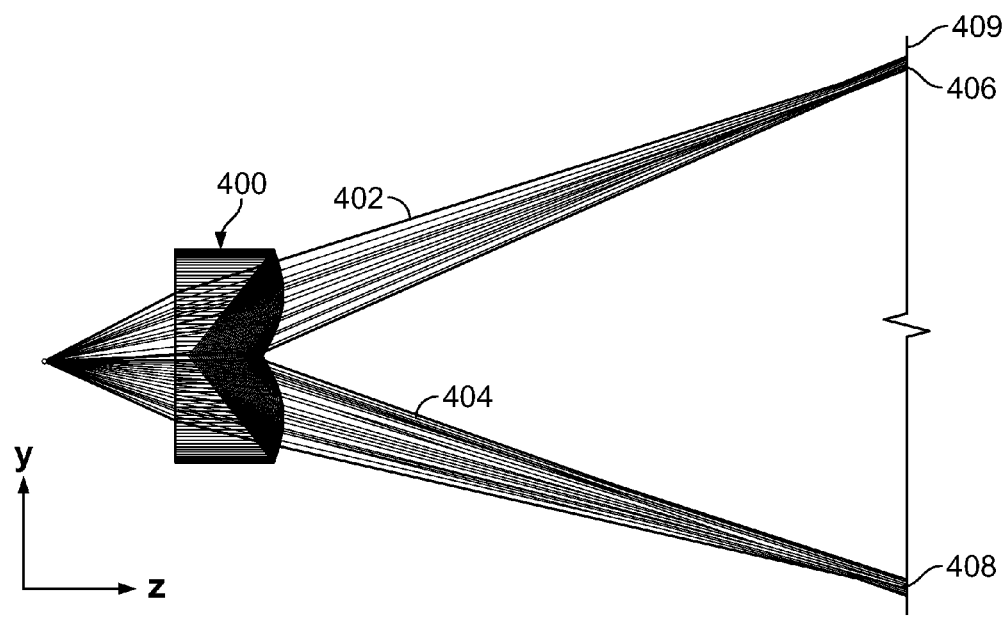
FIG. 29 illustrates a focusing concave lens formed in accordance with an embodiment of the present invention.

FIG. 29 illustrates a focusing concave lens 400 that defines the refraction direction at each surface point on the focusing concave lens 400 so that first and second beams 402 and 404 focus to first and second focal points 406 and 408, respectively. In this example, the first and second focal points 406 and 408 are defined on detector plane 409 that represents the IR receivers, such as the receivers 386 of FIG. 28. The first and second focal points 406 and 408 may be moved to arbitrary locations in the forward (Z) direction.

Figure 30:
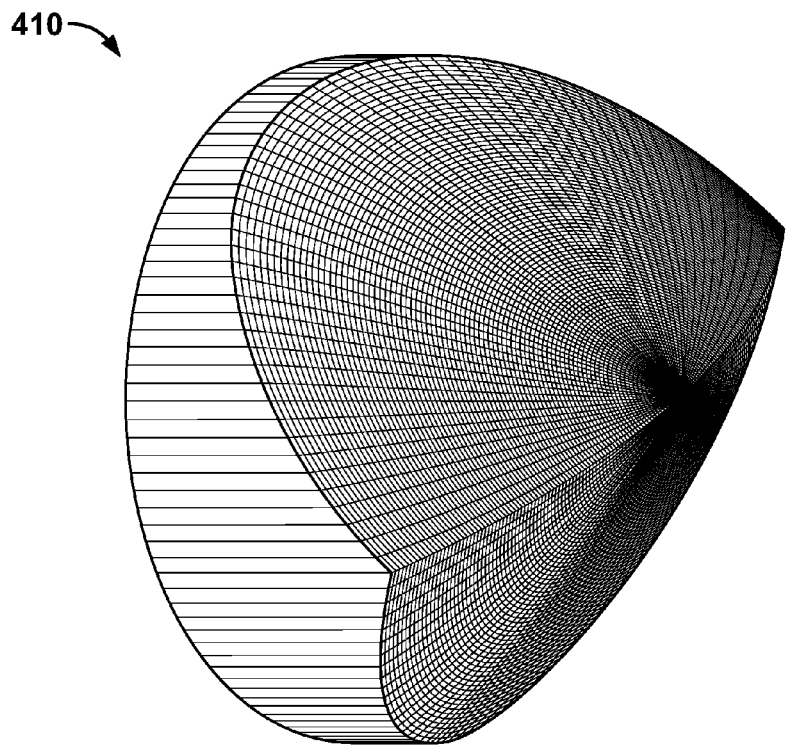
FIG. 30 illustrates a non-focusing convex lens formed in accordance with an embodiment of the present invention.
Figure 31:
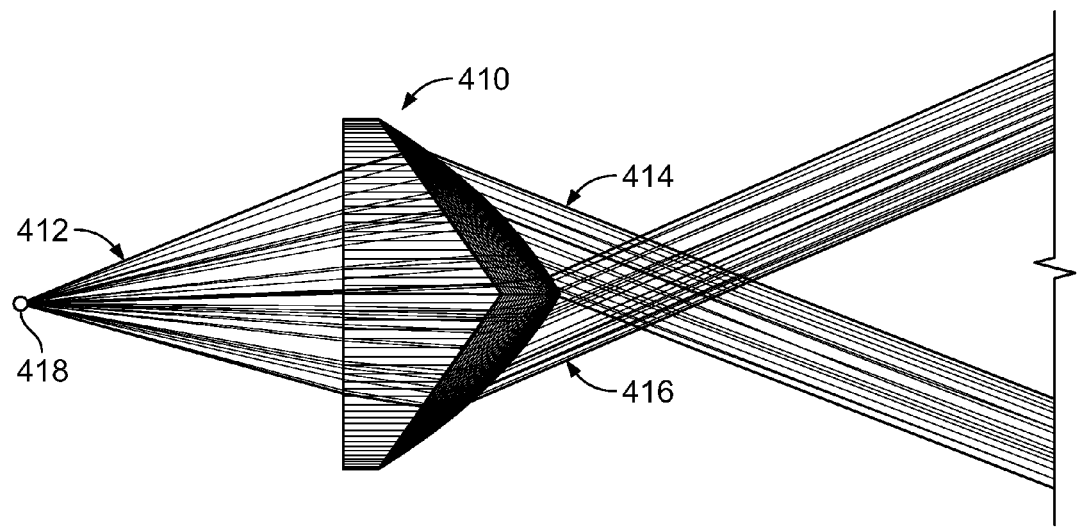
FIG. 31 illustrates the non-focusing convex lens of FIG. 30 splitting an incoming IR beam into first and second beams in accordance with an embodiment of the present invention.

FIG. 30 illustrates a non-focusing convex lens 410. FIG. 31 illustrates the non-focusing convex lens 410 splitting an incoming IR beam 412 into first and second beams 414 and 416. The first and second beams 414 and 416 are at +/−22.5 degrees as discussed previously. For clarity of illustration, a point source 418 generating the IR beam 412 of light is again assumed in this example.

In addition, a focusing convex lens (not shown) may be used. The focusing convex lens splits an incoming IR beam into first and second beams which are focused at first and second focal points on the detector plane, as discussed previously with FIG. 29. It is also noted that tri-beam lenses may also be designed to split an incoming IR beam into three beams as needed to support IR XYUV designs analogous to the SAW XYUV touchscreen of FIG. 6.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A touchscreen system comprising:
   a substrate comprising a touch area having X and Y dimensions;
   a first beam splitter positioned proximate to an outer edge of the X dimension of the touch area and configured to split a first beam into at least a first X beam and a second X beam, wherein the first X beam and the second X beam travel through the touch area in different directions with respect to each other, and the first X beam or the second X beam travels in the same direction as and parallel to the first beam;
   a second beam splitter positioned proximate to an outer edge of the Y dimension of the touch area and configured to split a second beam into at least a first Y beam and a second Y beam, wherein the first Y beam and the second Y beam travel through the touch area in different directions with respect to each other; and
   receive sensors configured to receive the first X beam, second X beam, first Y beam, and second Y beam and to determine locations of multiple touches on the touch area.

2. The touchscreen system of claim 1, wherein each of the first and second beam splitters comprises a top side and a bottom side, the bottom side interfacing with the substrate, and further comprising a seal being formed at least along the top side of the first and second beam splitters.

3. The touchscreen system of claim 1, wherein the first beam splitter is configured to cause one of the first X beam or the second X beam to travel through the touch area along an X direction and cause the other of the first X beam or the second X beam to travel through the touch area in a U direction at a diagonal angle.

4. The touchscreen system of claim 1, wherein each of the first and second beam splitters comprises a linear segment fabricated on the substrate.

5. The touchscreen system of claim 1, wherein the first beam splitter is configured to split the first beam into a third X beam that travels through the touch area in a different direction with respect to the first X beam and the second X beam such that:
   the first X beam travels through the touch area along an X direction,
   the second X beam travels through the touch area in a U direction at a diagonal angle, and
   the third X beam travels through the touch area in a V direction at another diagonal angle.

6. The touchscreen system of claim 5, wherein the first beam splitter or the second beam splitter comprises a superposition of two or more pluralities of deflecting elements, the two or more pluralities of deflecting elements having different respective orientations.

7. The touchscreen system of claim 1, wherein the first beam splitter or the second beam splitter comprises screen printed glass frit material.

8. The touchscreen system of claim 1, wherein the first beam splitter or the second beam splitter comprises composite polymer material ink.

9. The touchscreen system of claim 1, wherein the first beam splitter or the second beam splitter comprises etched grooves.

10. A method for detecting multiple touches on a touchscreen system, the method comprising:
    transmitting a first beam and a second beam proximate to outer edges of a touch area;
    splitting the first beam to form at least a first X beam and a second X beam traveling in different directions through a touch area with respect to each other, wherein the first X beam or the second X beam travels in the same direction as and parallel to the first beam;
    splitting the second beam to form at least a first Y beam and a second Y beam traveling in different directions through the touch area with respect to each other;
    receiving, via at least one receiver, the first and second X beams and the first and second Y beams; and
    detecting a location of at least two externally generated touches within the touch area based on the first and second X beams and the first and second Y beams.

11. The method of claim 10, further comprising:
    deflecting the first and second X beams and the first and second Y beams to travel along the outer edges of the touch area.

12. The method of claim 10, wherein the splitting the first beam comprises directing the first X beam in an X direction and the second X beam in a U direction at a diagonal angle.

13. The method of claim 10, wherein the splitting the first beam comprises splitting the first beam to form a third X beam traveling in a V direction at a diagonal angle.

14. A touchscreen system comprising:
    a first transmitter configured to transmit an X beam;
    a second transmitter configured to transmit a Y beam;
    a first beam splitter, fabricated proximate to a touch screen area, configured to split the X beam into at least a first X beam and a second X beam that travel through the touch area in different directions with respect to each other, and wherein the first X beam or the second X beam travels in the same direction as and parallel to the first beam;
    a second beam splitter, fabricated proximate to the touch screen area, configured to split the Y beam into at least a first Y beam and a second Y beam that travel through the touch area in different directions with respect to each other; and
    a sensor configured to receive the first and second X beams and the first and second Y beams and to determine locations of multiple touches on the touch area.

15. The touchscreen system of claim 14, further comprising:
    a controller configured to determine the locations of the multiple touches based on two or more attenuations of the first and second X beams and the first and second Y beams that travel through the touch area.

16. The touchscreen system of claim 1, wherein the second X beam and the second Y beam are parallel.

17. The touchscreen system of claim 3, wherein the diagonal angle is 45 degrees.

18. The touchscreen system of claim 5, wherein the U direction and the V direction are orthogonal.

19. The touchscreen system of claim 1, further comprising:
an X array positioned proximate to the outer edge of the X dimension of the touch area and configured to deflect the first beam transmitted through the X array towards the touch area;
a Y array positioned proximate to the outer edge of the Y dimension of the touch area and configured to deflect the second beam transmitted through the Y array towards the touch area;
a first transmitter configured to transmit the first beam through the X array; and
a second transmitter configured to transmit the second beam through the Y array.

20. The touchscreen system of claim 1, further comprising:
a first transmitter configured to transmit the first beam towards the first beam splitter; and
a second transmitter configured to transmit the second beam towards the second beam splitter.

21. The touchscreen system of claim 20, wherein the first and second transmitters are configured to transmit IR wave energy.

22. The touchscreen system of claim 21, wherein:
the first transmitter comprises the first beam splitter; and
the second transmitter comprises the second beam splitter.

23. The touchscreen system of claim 22, wherein each of the first and second beam splitters comprises a non-focusing concave lens.

24. The touchscreen system of claim 22, wherein each of the first and second beam splitters comprises a non-focusing convex lens.

25. The touchscreen system of claim 21, wherein each of the first and second beam splitters comprises a diffraction grating.

26. The touchscreen system of claim 21, wherein each of the first and second beam splitters comprises an array of notches.

27. The touchscreen system of claim 26, wherein each notch in the array of notches is associated with each of the first and second transmitters.

28. The touchscreen system of claim 26, wherein the array of notches comprises a plurality of notches each spaced so that the first or second beam from the first or second transmitter, respectively, produces the X or Y deflected and the X or Y undeflected beam independent of where the first or second transmitter is placed.

29. The touchscreen system of claim 21, wherein each of the first and second beam splitters comprises a refractive beam splitter.

30. The touchscreen system of claim 21, wherein each of the first and second beam splitters comprises a reflective beam splitter.

31. The touchscreen system of claim 21, wherein:
the first transmitter is positioned perpendicular to the first beam splitter; and
the second transmitter is positioned perpendicular to the second beam splitter.

32. The touchscreen system of claim 21, wherein:
the first beam splitter comprises an incoming or outgoing surface tilted with respect to the first transmitter; and
the second beam splitter comprises an incoming or outgoing surface tilted with respect to the second transmitter.

33. The touchscreen system of claim 21, wherein the first beam splitter is positioned to intercept a portion of the first beam transmitted by the first transmitter, and wherein another portion of the first beam bypasses the first beam splitter.

34. The touchscreen system of claim 1, wherein the first X and Y beams are positioned perpendicular to each other and the second X beam and second Y beam are offset with respect to the first X beam, the first Y beam, and each other.

35. The touchscreen system of claim 1, wherein at least one of the first X beam and first Y beam is unprocessed by the sensors.

36. The touchscreen system of claim 1, further comprising:
a first deflective array positioned parallel to the first beam splitter and configured to receive the first beam and deflect the first beam at a first angle into the first beam splitter; and
a second deflective array positioned parallel to the second beam splitter and configured to receive the second beam and deflect the second beam at a second angle into the second beam splitter.

37. The touchscreen system of claim 36, wherein the first deflective array is configured to deflect the first beam into the first beam splitter at approximately a 90° angle and the second deflective array is configured to deflect the second beam into the second beam splitter at approximately a 90° angle.

38. The touch screen system of claim 36, further comprising:
a third deflective array positioned parallel to the first beam splitter and across the touch area from the first deflective array and configured to deflect the first X beam or the second X beam at an angle into one of the receive sensors; and
a fourth deflective array positioned parallel to the second beam splitter and across the touch area from the second deflective array and configured to deflect the first Y beam or the second Y beam at an angle into one of the receive sensors.

39. The touch screen system of claim 38, further comprising:
a third beam splitter positioned parallel to the third deflective array and between the third deflective array and the touch area and configured to receive the first X beam or the second X beam and propagate the first X beam or the second X beam to the third reflective array.

* * * * *